(12) United States Patent
Har et al.

(10) Patent No.: US 10,392,107 B2
(45) Date of Patent: Aug. 27, 2019

(54) AERIAL VEHICLE CAPABLE OF VERTICAL TAKE-OFF AND LANDING, VERTICAL AND HORIZONTAL FLIGHT AND ON-AIR ENERGY GENERATION

(71) Applicant: Korea Advanced Institute of Science and Technology, Daejeon (KR)

(72) Inventors: Dongsoo Har, Daejeon (KR); Sang Min Lee, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/852,444

(22) Filed: Dec. 22, 2017

(65) Prior Publication Data

US 2018/0178910 A1  Jun. 28, 2018

Related U.S. Application Data

(63) Continuation-in-part of application No. 15/391,700, filed on Dec. 27, 2016.

(30) Foreign Application Priority Data

Sep. 27, 2017  (KR) ........................ 10-2017-0125497

(51) Int. Cl.
 *B64D 27/24* (2006.01)
 *B64C 29/00* (2006.01)
 (Continued)

(52) U.S. Cl.
 CPC .......... *B64C 29/0033* (2013.01); *B64D 27/24* (2013.01); *B64D 41/007* (2013.01);
 (Continued)

(58) Field of Classification Search
 CPC .... B64C 29/0033; B64D 27/24; B64D 41/007
 See application file for complete search history.

(56) References Cited

U.S. PATENT DOCUMENTS 2,953,322 A  9/1960 Lewis
3,116,040 A  12/1963 Petrides et al.
(Continued)

FOREIGN PATENT DOCUMENTS

JP     5193583 A    8/1993
KR  1020150086398 A  7/2015
(Continued)

*Primary Examiner* — Justin M Benedik

(57) ABSTRACT

An aerial vehicle includes: a main body; two main wings arranged to the main body; two main wing tilting control units coupled to the main wings to control the main wings to tilt independently; two main propulsion units arranged to the main wings; tail wings arranged to a rear side of the main body; a rudder arranged to the tail wing; a rudder tilting control unit to control the rudder to tilt; a tail propulsion unit arranged to the rear side of the main body; a tail tilting control unit to control the tail propulsion unit to tilt; a power unit to provide power to the main and tail propulsion units; and a position control unit to control the main wing tilting control units, the main propulsion units, the rudder tilting control unit, the tail propulsion unit, the tail tilting control unit to adjust position of the aerial vehicle.

11 Claims, 27 Drawing Sheets

(51) Int. Cl.
  *B64D 41/00*   (2006.01)
  *F16H 19/00*   (2006.01)
  *F16H 21/44*   (2006.01)
  *F16H 19/04*   (2006.01)
  *F15B 15/06*   (2006.01)

(52) U.S. Cl.
  CPC ............ *F15B 15/06* (2013.01); *F16H 19/001* (2013.01); *F16H 19/04* (2013.01); *F16H 21/44* (2013.01)

(56) References Cited

U.S. PATENT DOCUMENTS

| | | | |
|---|---|---|---|
| 3,179,354 A * | 4/1965 | Alvarez-Calderon | ...................... B64C 23/00 244/12.4 |
| 3,259,343 A * | 7/1966 | Roppel | ............... B64C 29/0075 244/12.4 |
| 4,537,372 A | 8/1985 | Forizs | |
| 4,982,914 A * | 1/1991 | Eickmann | ............... B64C 11/28 244/54 |
| 6,561,455 B2 * | 5/2003 | Capanna | ................. B64C 29/02 244/7 A |
| 6,655,631 B2 * | 12/2003 | Austen-Brown | ....... B64C 27/28 244/12.4 |
| 8,505,846 B1 * | 8/2013 | Sanders, II | ............. B64C 29/02 244/7 A |
| 8,820,672 B2 | 9/2014 | Erben et al. | |
| 8,991,751 B2 * | 3/2015 | Page | ...................... B64C 29/02 244/78.1 |
| 9,481,457 B2 * | 11/2016 | Alber | .................... B64C 39/024 |
| 9,550,577 B1 | 1/2017 | Beckman et al. | |
| 9,567,079 B2 * | 2/2017 | Johnson | ................. B64C 39/024 |
| 9,994,313 B2 | 6/2018 | Claridge et al. | |
| 2003/0085319 A1 * | 5/2003 | Wagner | ..................... B64C 3/56 244/12.3 |
| 2014/0008498 A1 * | 1/2014 | Reiter | ..................... B64C 29/02 244/7 A |

FOREIGN PATENT DOCUMENTS

| | | |
|---|---|---|
| KR | 101621210 B1 | 3/2016 |
| KR | 1020160072522 A | 6/2016 |
| KR | 101682670 B1 | 10/2016 |
| WO | 2017158417 A1 | 9/2017 |

* cited by examiner

Transition

Horizontal flight
Yaw operation

AERIAL VEHICLE CAPABLE OF VERTICAL TAKE-OFF AND LANDING, VERTICAL AND HORIZONTAL FLIGHT AND ON-AIR ENERGY GENERATION

CROSS-REFERENCE TO RELATED APPLICATIONS

This application is a continuation-in-part of application Ser. No. 15/391,700, filed on Dec. 27, 2016, titled "An Aircraft Capable of Vertical Take-off and Landing, Vertical and Horizontal Flight and On-Air Energy Generation" and claims priority under 35 U.S.C. 119(a) to Korean application number 10-2017-0125497, filed on Sep. 27, 2017, in the Korean Intellectual Property Office, which is incorporated herein by reference in its entirety as set forth in full.

BACKGROUND

1. Field

Various embodiments relate to an aerospace engineering, and more particularly, an aerial vehicle having fixed wings capable of independently tilt from one another. The various embodiments are applicable to manned and unmanned aerial vehicle, which are autonomous or controlled.

2. Description of the Related Art

Nowadays, fixed wing aerial vehicles with the capability of short or vertical take-off and landing are disclosed in aerial vehicles of multiple sizes. For the case of small fixed wing aerial vehicles, there are many different known technologies used to enable the capability of short or vertical take-off and landing.

One of the possible ways of the take-off of a fixed wing aerial vehicle without the use of a runway is the assisted take-off measure. This assisted take-off measure is performed by providing an initial impulse to the aerial vehicle to become airborne.

Once in the air, a control system of the aerial vehicle may act in conjunction with the motors in order to keep it stable and balanced in a flight operation.

Disadvantages with this technology is that sometimes it may need a special slingshot device to enable a secure launching of the fixed wing aerial vehicle, thereby making the take-off more time consuming and complex. Other disadvantages may be the risk of injure of the fixed wing aerial vehicle in the case of a failed launch.

For a completely unassisted take-off, one possible way that can be employed for the take-off is a tilted rotor scheme. In a tilted rotor configuration, the wings are fixed and only the motors can move during take-off and flight regime. In this scheme, when the aerial vehicle is still grounded, the rotors face its thrust power to the ground vertically in order to push the aerial vehicle to perform a vertical take-off similar to a rotary wing aerial vehicle. Once airborne, the rotors of the tilted rotor aerial vehicle may rotate its position in order to provide either push or pull thrust into the wings to generate the necessary lift force to keep the aerial vehicle airborne.

While this procedure can perform a take-off without any extra assistance, it has a big shortcoming due to the aerodynamic drag during the take-off. Since the wings may remain in the same configuration, its surface provides a huge aerodynamic drag, making the amount of air that is needed to be pushed out of the way much bigger, and consequently the amount of thrust necessary by the motors significantly higher.

Another scheme that can be used is tilted wings and fixed rotors. In this configuration, the rotors always point at the same direction but the wings have the options of tilting by a number of degrees. This tilting wing configuration performs the take-off in a very similar manner to the tilted wings rotor configuration. The major difference and advantage of the scheme of the tilted wings and fixed rotors when compared with the tilted rotors scheme is that since the wing of the scheme of the tilted wings and fixed rotors is in vertical form, the aerodynamic drag may be reduced and consequently provide the system of the aerial vehicle with better stability.

The main disadvantage of this scheme of the tilted wings and fixed rotors is in the amount of lift force needed for the system of the aerial vehicle to be able to reach liftoff. A stable take-off procedure usually requires a system of the aerial vehicle with 4 motors, which ends up draining much of the energy stored in the aerial vehicle and consequently shortening its flying time.

Aerial vehicles operate with electrical power, and therefore demand a procedure to regulate and control the power of the system of the aerial vehicle to avoid a fast dropout in energy. The energy source of small aerial vehicles in both fixed wing and rotary wing configuration is usually an electrical battery.

Most of the aerial vehicles available not only to the public but also used for military and civil duties utilize electrical power as its source of energy. Batteries therefore must be installed on the aerial vehicle to provide a large flying time and make the system of the aerial vehicle able to operate efficiently. Greater batteries are mounted on the aerial vehicle; more consumption of the energy is required in the aerial vehicle for the take-off and flight of the aerial vehicle. This incurs on a tradeoff between the power provided by the batteries of the aerial vehicle and the power consumed in the aerial vehicle since batteries add significant weight to the aerial vehicle, and therefore require a higher energy to provide enough lift force to keep the aerial vehicle airborne.

In order to control consumption of the energy, a battery management system of the aerial vehicle is included in most electrically operating aerial vehicle. This system of the aerial vehicle is more useful in the situations where there are multiple battery packs, and a control scheme is needed for both the discharging and charging of the batteries.

In quadrotor configuration, all of the lift force of the aerial vehicle comes from the motors, which causes a drain in the battery extremely fast. In fixed wings configuration, the lift forces come not only from the motors but also from the wings interaction with the freestream of air. Due to this fact, the amount of power required by the motors is going to be substantially lower.

SUMMARY

In an embodiment, an aerial vehicle may include: a main body arranged in a first direction; two main wings arranged to the main body in a second direction substantially perpendicular to the first direction, the two main wings oppositely arranged to each other; two main wing tilting control units respectively coupled to the main wings and adapted to control the main wings to tilt independently to each other; two main propulsion units respectively arranged to the main wings; tail wings arranged to a rear side of the main body in the second and third directions substantially perpendicular to the first direction; a rudder arranged to the tail wing of the third direction; a rudder tilting control unit adapted to control the rudder to tilt; a tail propulsion unit arranged to the rear side of the main body; a tail tilting control unit adapted to control the tail propulsion unit to tilt; a power unit adapted to provide power to the main and tail propulsion units; and a position control unit adapted to control the main wing tilting control units, the main propulsion units, the rudder tilting control unit, the tail propulsion unit, the tail tilting control unit to adjust position of the aerial vehicle while airborne.

The main wings may be of symmetrical configuration. The tail wings of the second direction may be oppositely arranged to each other and of symmetrical configuration.

The main wing tilting control units and the tail tilting control unit may tilt the main wings and the tail wings such that the main and tail propulsion units provide thrust and lift during a flight of the aerial vehicle in the third direction.

The main wing tilting control units and the tail tilting control unit may tilt the main wings and the tail wings such that the main and tail propulsion units provide thrust and lift during a flight of the aerial vehicle in a space formed by the first and second directions.

The tail propulsion unit may be turned off and may generate power from air stream during a flight of the aerial vehicle in a space formed by the first and second directions. The power unit is charged by the tail propulsion unit during the flight of the aerial vehicle in the space formed by the first and second directions.

The main wing tilting control units may tilt the main wings in the same direction so that the aerial vehicle makes a pitch motion during a flight of the aerial vehicle in a space formed by the first and second directions or in the third direction.

The rudder tilting control unit may tilt the rudder so that the aerial vehicle makes a yaw motion during a flight of the aerial vehicle in a space formed by the first and second directions.

The main wing tilting control units may tilt the main wings in opposite directions so that the aerial vehicle makes a roll motion during a flight of the aerial vehicle in a space formed by the first and second directions.

The main wing tilting control units may tilt the main wings in opposite directions so that the aerial vehicle makes a yaw motion during a flight of the aerial vehicle in the third direction.

The main propulsion units may provide different propulsion from each other so that the aerial vehicle makes a roll motion during a flight of the aerial vehicle in the third direction.

The position control unit may include: a memory adapted to store reference position values; a sensing unit adapted to generate current position values by sensing current position of the aerial vehicle; and a position correction unit adapted to generate correction values by comparing the reference position values and the current position values, and provide the correction values to the main wing tilting control units, the main propulsion units, the rudder tilting control unit, the tail propulsion unit and the tail tilting control unit.

DETAILED DESCRIPTION

Figure 1:
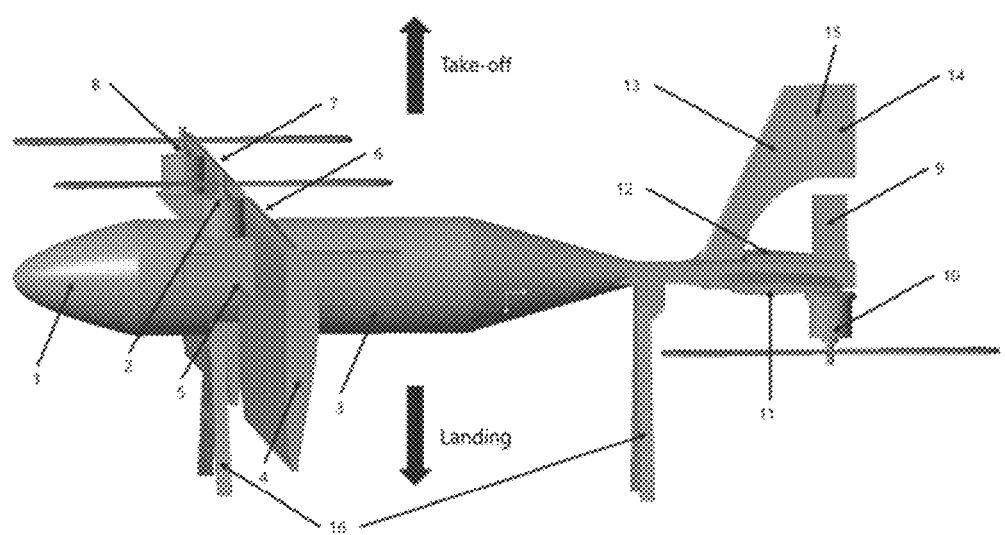
FIG. 1 shows a vertical take-off position of an aerial vehicle in accordance with an embodiment of the present disclosure.

Various embodiments may be described below in more detail with reference to the accompanying drawings. The present invention may, however, be embodied in different forms and should not be construed as limited to the embodiments set forth herein. Rather, these embodiments are provided so that this disclosure may be thorough and complete and may fully convey the scope of the present invention to those skilled in the art. The drawings are not necessarily to scale and in some instances, proportions may have been exaggerated in order to clearly illustrate features of the embodiments. Throughout the disclosure, reference numerals correspond directly to the like parts in the various figures and embodiments of the present invention. It is also noted that in this specification, "connected/coupled" refers to one component not only directly coupling another component but also indirectly coupling another component through an intermediate component. In addition, a singular form may include a plural form as long as it is not specifically mentioned in a sentence. It should be readily understood that the meaning of "on" and "over" in the present disclosure should be interpreted in the broadest manner such that "on" means not only "directly on" but also "on" something with an intermediate feature(s) or a layer(s) therebetween, and that "over" means not only directly on top but also on top of something with an intermediate feature(s) or a layer(s) therebetween.

The propulsion system, energy storage scheme and flight configuration in accordance with embodiments of the present disclosure may be applied for many types of aerial vehicle. Embodiments of the present disclosure may also be applied to manned and unmanned aerial vehicles, which are autonomous or controlled.

FIG. 1 shows a vertical take-off position of an aerial vehicle in accordance with an embodiment of the present disclosure.

Referring to FIG. 1, the aerial vehicle in accordance with embodiments of the present disclosure may include two main wings 4 and 7 provided both sides of a main body 3. Two electric main wing motors 2 and 8 may be provided to the main wings 4 and 7 in a tractor configuration, respectively. Main wing actuators 5 and 6 may be provided between the main body 3 and the main wings 4 and 7, respectively. The main wing actuators 5 and 6 may operate independently from each other. Therefore, the main wings 4 and 7 may tilt independently from each other. Because of the independent tilts of the main wings 4 and 7, thrust directions of the electric main wing motors 2 and 8 may be controlled independently from each other. The electric main wing motors 2 and 8 and main wing propellers coupled to the electric main wing motors 2 and 8 may be provided to front side of the main wings 4 and 7 in a tractor configuration, respectively.

The aerial vehicle in accordance with embodiments of the present disclosure may further include horizontal wings 11 and 12 and a vertical wing 13 provided to rear side of the main body 3.

A rudder 14 may be provided to the vertical wing 13. The rudder 14 may be controlled by a vertical tail actuator 15 provided between the vertical wing 13 and the rudder 14.

A tail motor 10 along with a tail propeller may be provided between the horizontal wings 11 and 12. The tail motor 10 may provide horizontal and vertical thrusts to the aerial vehicle in accordance with embodiments of the present disclosure. Tilt of the tail motor 10 may be controlled by a tail actuator 9 arranged between the horizontal wings 11 and 12. The tail motor 10 may be of a pusher configuration.

Each pair of the main wings 4 and 7 and the horizontal wings 11 and 12 may be of a symmetrical tapered straight sweep configuration.

The aerial vehicle in accordance with embodiments of the present disclosure may be powered from a plurality of battery cell sets (not illustrated) provided therein.

FIG. 1 shows a vertical take-off and landing position of the aerial vehicle in accordance with embodiments of the present disclosure.

Referring to FIG. 1, the aerial vehicle may be hold into a landing position using as support landing gears 16 arranged in front and rear sides of the main body 3. During take-off of the aerial vehicle, the main wings 4 and 7 and the tail motor 10 may rotate into a vertical direction by the main wing actuators 5 and 6 and the tail actuator 9. The electric main wing motors 2 and 8 and the tail motor 10 may be turned on to provide maximum thrust and lift to the aerial vehicle. During landing of the aerial vehicle, the main wings 4 and 7 and the tail motor 10 may be kept in the vertical configuration without any tilting while the electric main wing motors 2 and 8 and the tail motor 10 may vary their thrust and lift for the safe landing of the aerial vehicle to the ground. Upon completion of the landing, the aerial vehicle may be hold into the landing position using as support the landing gears 16. The electronics and all the major components may be arranged in a nose 1 and the main body 3 of the aerial vehicle.

First and second battery packs as the power source of the aerial vehicle may be arranged in the main body 3. The electric main wing motors 2 and 8 and the tail motor 10 may be powered from the first and second battery packs. During the take-off of the aerial vehicle, one of the first and second battery packs may provide power to the tail motor 10 and the other one of the first and second battery packs may provide power to the electric main wing motors 2 and 8.

Figure 2:
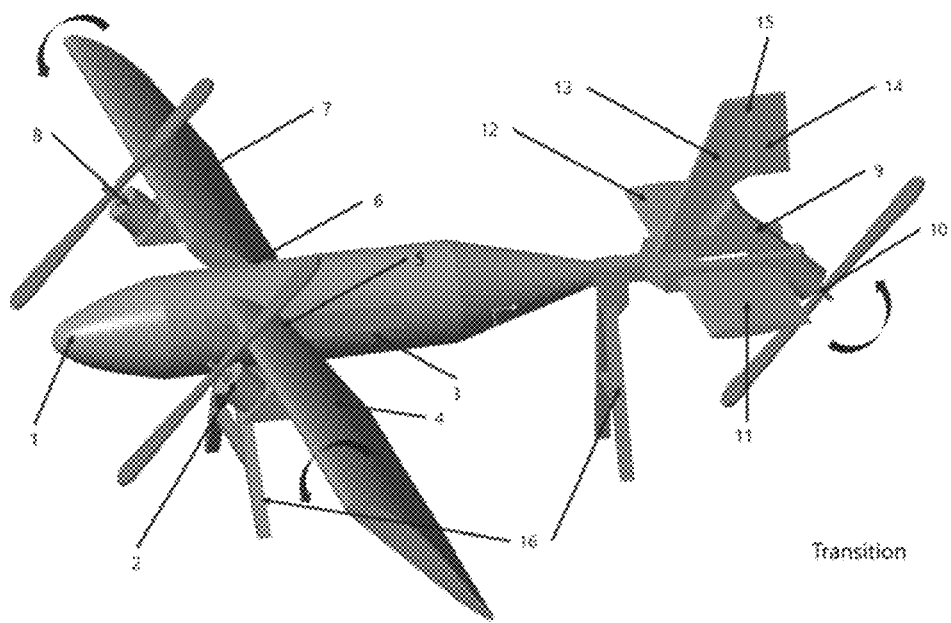
FIG. 2 shows the aerial vehicle changing its flight mode in accordance with an embodiment of the present disclosure.

FIG. 2 shows the aerial vehicle changing its flight mode in accordance with an embodiment of the present disclosure.

FIG. 2 shows the aerial vehicle changing its flight mode from a vertical flight mode to a horizontal flight mode. Once the aerial vehicle is off the ground and reaches a high enough altitude, the main wing actuators 5 and 6 and the tail actuator 9 may gradually tilt the main wings 4 and 7 and the tail motor 10 so that the aerial vehicle may change its flight mode from the vertical flight mode into the horizontal flight mode.

Figure 3:
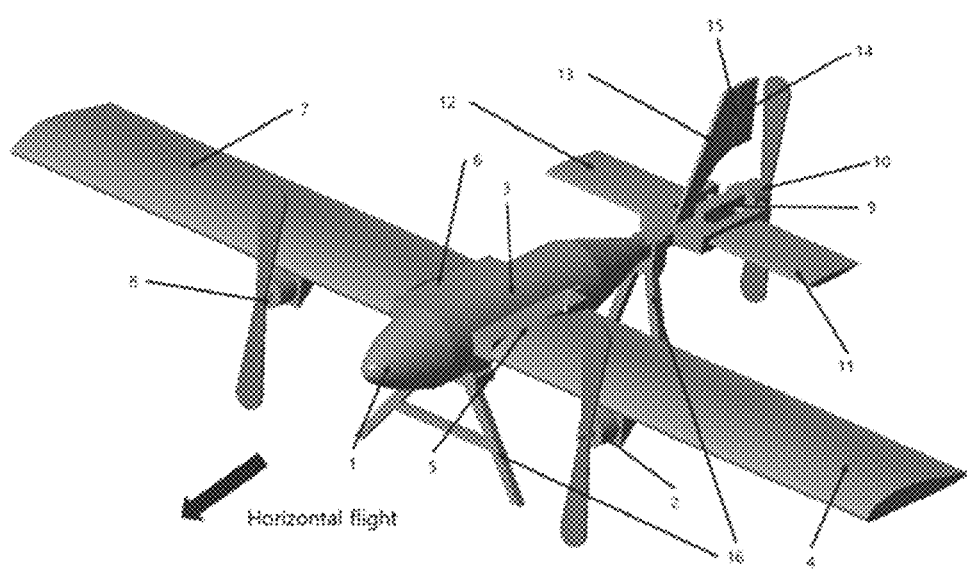
FIG. 3 shows the aerial vehicle in a horizontal flight mode in accordance with an embodiment of the present disclosure.

FIG. 3 shows the aerial vehicle in the horizontal flight mode in accordance with an embodiment of the present disclosure.

Referring to FIG. 3, once in the horizontal flight mode and after a certain speed is reached during the horizontal flight of the aerial vehicle, the tail motor 10 may be turned off and start acting as a generator while the electric main wing motors 2 and 8 continue their operations. The energy provided by the tail motor 10 may charge one of the first and second battery packs, which at the moment has less amount of energy left, while the other one may provide energy to at least the electric main wing motors 2 and 8. Airstream flowing from front side to rear side of the aerial vehicle as a result of the mode change to the horizontal flight mode of the aerial vehicle may spin the propeller of the tail motor 10 to generate power such that the power is charged into the first and second battery packs.

One of the first and second battery packs may provide its power to the electric main wing motors 2 and 8 and the other one of the first and second battery packs may provide its power to the tail motor 10. Between the first and second battery packs, one having more remaining power may be switched to provide the remaining power to the electric main wing motors 2 and 8. The aerial vehicle may further include additional power source available for emergency landing thereof.

Once changed to the horizontal flight mode, the aerial vehicle may fly only with the electric main wing motors 2 and 8. In the horizontal flight mode, the aerial vehicle may be provided with lift from the main wings 4 and 7 tilted in parallel with the main body 3.

Figure 4:
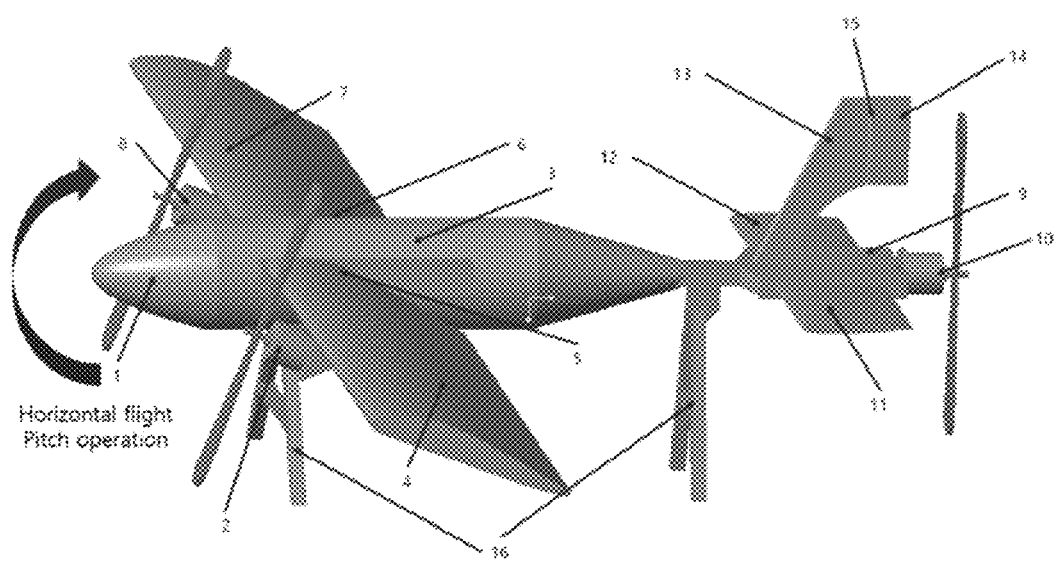
FIG. 4 shows a pitch motion of the aerial vehicle in the horizontal flight mode.

FIG. 4 shows a pitch motion of the aerial vehicle in the horizontal flight mode.

FIG. 4 shows a pitch operation of the aerial vehicle in the horizontal flight mode. During the pitch operation in the horizontal flight mode, the main wing actuators 5 and 6 may tilt the electric main wing motors 2 and 8 into a direction requiring lift. In this situation, the main wing actuators 5 and 6 may provide the pitch of the aerial vehicle by rotating into the same direction. As illustrated in FIG. 4, when the main wings 4 and 7 are tilted upward by the main wing actuators 5 and 6, the thrust generated by the electric main wing motors 2 and 8 may include ascending vertical component, the thrust of which lifts a head of the aerial vehicle and provide the upward pitch. On the contrary, when the main wings 4 and 7 are tilted downward by the main wing actuators 5 and 6, the thrust generated by the electric main wing motors 2 and 8 may include descending vertical component, the thrust of which presses down the head of the aerial vehicle and provide the downward pitch. During the pitch operation of the electric main wing motors 2 and 8, a main thrust may be provided again from the tail motor 10 when necessary.

Figure 5:
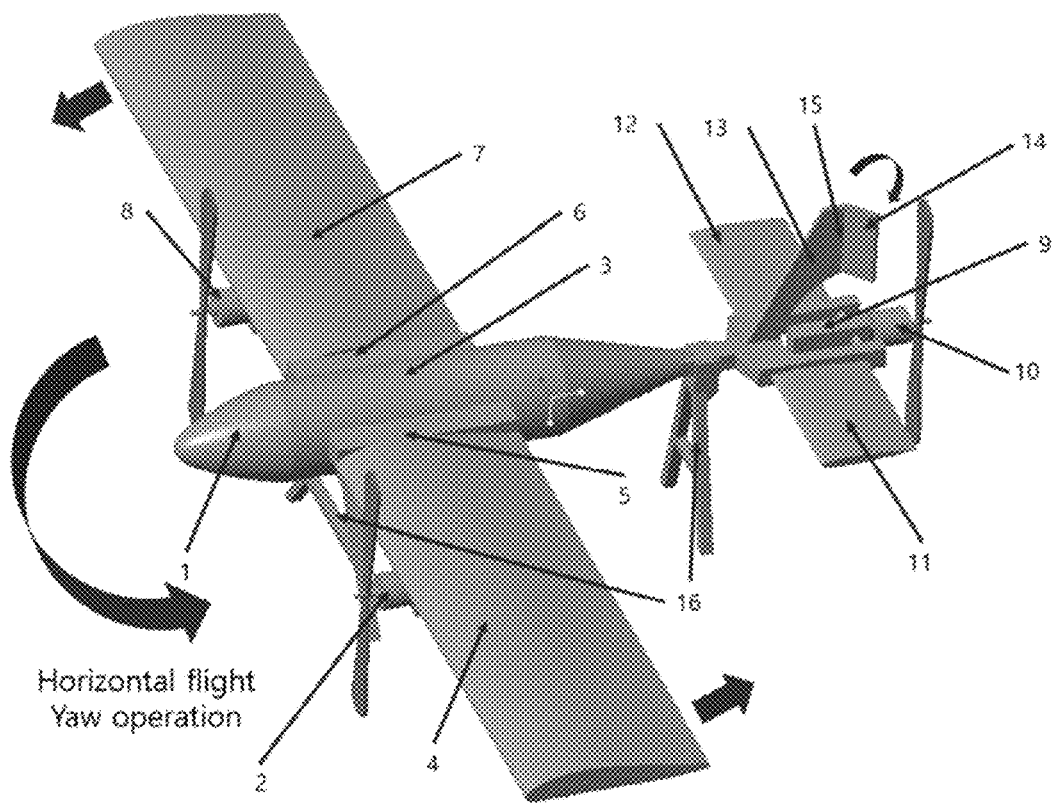
FIG. 5 shows a yaw motion of the aerial vehicle in the horizontal flight mode.

FIG. 5 shows a yaw motion of the aerial vehicle in the horizontal flight mode.

FIG. 5 shows a yaw operation of the aerial vehicle in the horizontal flight mode. In the horizontal flight mode, the vertical tail actuator 15 may rotate the rudder 14 in clockwise direction to rotate the aerial vehicle in counterclockwise direction. On the contrary, the vertical tail actuator 15 may rotate the rudder 14 in counterclockwise direction to rotate the aerial vehicle in clockwise direction. In an embodiment, the aerial vehicle may perform the yaw operation by varying output power of the respective electric main wing motors 2 and 8.

Figure 6:
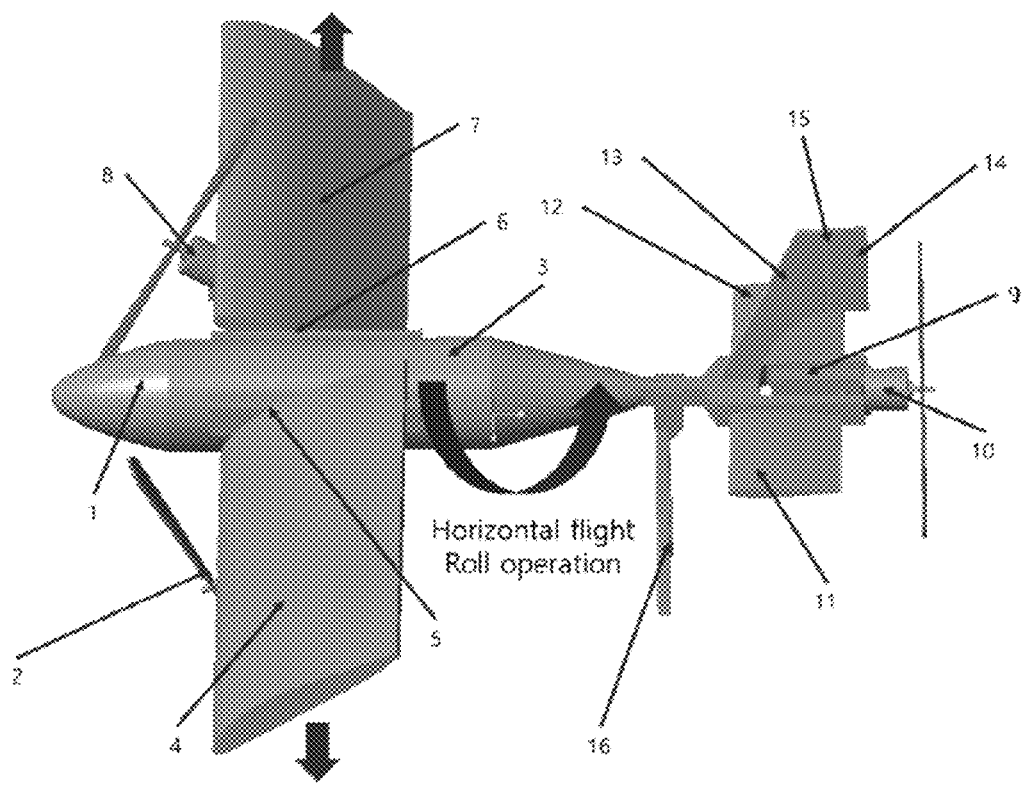
FIG. 6 shows a roll motion of the aerial vehicle in the horizontal flight mode.

FIG. 6 shows a roll motion of the aerial vehicle in the horizontal flight mode.

FIG. 6 shows a roll operation of the aerial vehicle in the horizontal flight mode. During the roll operation, the main wing actuators 5 and 6 may tilt the electric main wing motors 2 and 8 in opposite directions to each other. The aerial vehicle may roll in clockwise direction or counterclockwise direction according to the tilting directions of the main wings 4 and 7. As illustrated in FIG. 6, when the main wing actuators 5 and 6 tilt the right main wing 7 in the upward direction and the left main wing 4 in the downward direction, the thrust generated by the right main wing motor 8 may include ascending vertical direction and the thrust generated by the left main wing motor 2 may include descending vertical direction. These thrusts of the opposite directions may roll the aerial vehicle by rolling the main body 3 of the aerial vehicle in clockwise direction when we see the aerial vehicle from the front thereof. On the contrary, when the main wing actuators 5 and 6 tilt the right main wing 7 in the downward direction and the left main wing 4 in the upward direction, the thrust generated by the right main wing motor 8 may include descending vertical direction and the thrust generated by the left main wing motor 2 may include ascending vertical direction. These thrusts of the opposite directions may roll the aerial vehicle by rolling the main body 3 of the aerial vehicle in counterclockwise direction when we see the aerial vehicle from the front thereof.

Figure 7:
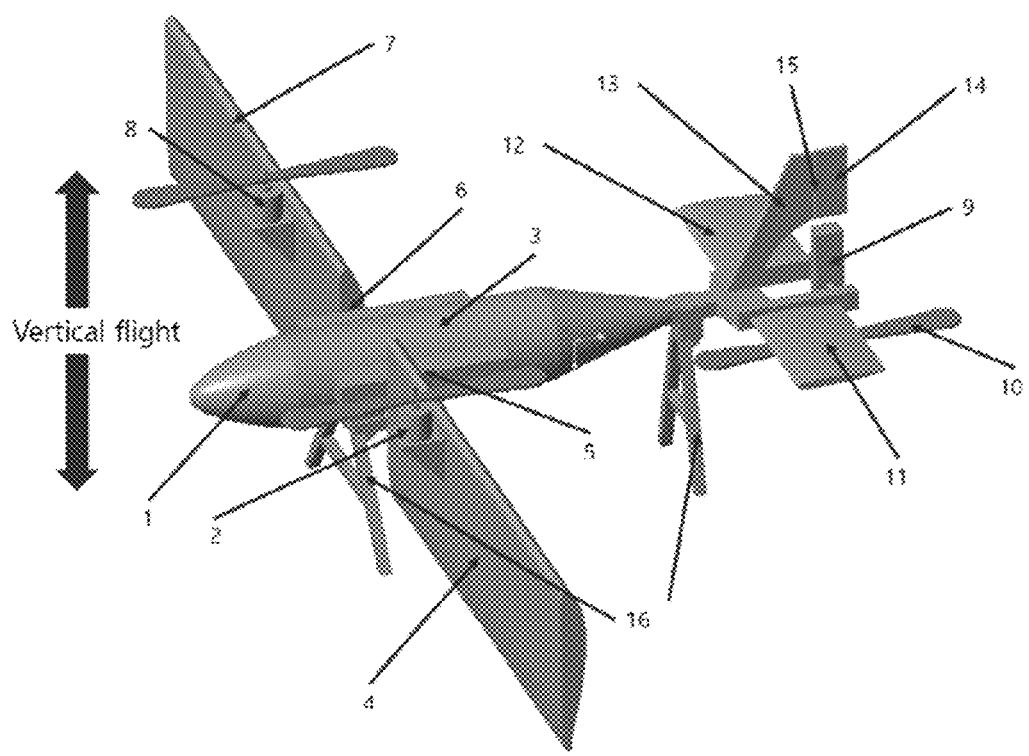
FIG. 7 shows the aerial vehicle in a vertical flight mode in accordance with an embodiment of the present disclosure.

FIG. 7 shows the aerial vehicle in the vertical flight mode in accordance with an embodiment of the present disclosure.

FIG. 7 shows the aerial vehicle ascending or descending in a vertical direction. During change from the horizontal flight mode to the vertical flight mode, the tail motor 10 may be turned on again and the tail motor 10 along with the electric main wing motors 2 and 8 may provide lift to the aerial vehicle. In the vertical flight mode, the lift may depend only on the thrust provided by the electric main wing motors 2 and 8 and the tail motor 10. When the aerial vehicle becomes in the vertical flight mode, the tail motor 10 may stop serving as a power generator and start to serve as a motor to provide again lift to the aerial vehicle. In the vertical flight mode, the aerial vehicle may adjust outputs of the electric main wing motors 2 and 8 and the tail motor 10, and the main wing actuators 5 and 6 and the tail actuator 9 may control when necessary thrust directions of the main wings 4 and 7 and the tail motor 10 by tilting the main wings 4 and 7 and the tail motor 10, which stabilize the aerial vehicle in the vertical flight mode. In the vertical flight mode, the main wing actuators 5 and 6 and the tail actuator 9 may provide the aerial vehicle with pitch, yaw and translation motion by independently tilting the main wings 4 and 7 and the tail motor 10. The translation motion in the vertical flight mode may be similar to the motion of the aerial vehicle during flight mode change. As illustrated in FIG. 2, the main wing actuators 5 and 6 and the tail actuator 9 may gradually tilt the main wings 4 and 7 and the tail motor 10, which are now in the vertical direction, and thus the electric main wing motors 2 and 8 and the tail motor 10 may generate thrust component of the horizontal direction.

Figure 8:
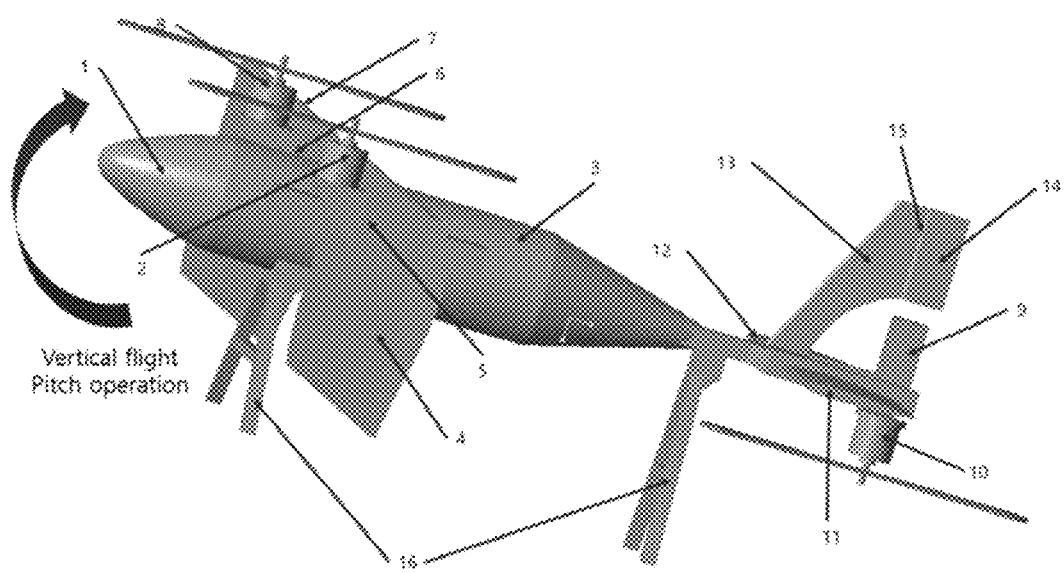
FIG. 8 shows a pitch motion of the aerial vehicle in the vertical flight mode.

FIG. 8 shows a pitch motion of the aerial vehicle in the vertical flight mode.

FIG. 8 shows a pitch operation of the aerial vehicle in the vertical flight mode. In the vertical flight mode, the aerial vehicle may be provided with lift from the electric main wing motors 2 and 8 and the tail motor 10. When output of the electric main wing motors 2 and 8 arranged in front side of the aerial vehicle is increased or output of the tail motor 10 arranged in rear side of the aerial vehicle is decreased in the vertical flight mode, the head of the aerial vehicle is lifted upward as illustrated in FIG. 8 and thus the aerial vehicle may perform the upward pitch operation. On the contrary, when output of the electric main wing motors 2 and 8 arranged in front side of the aerial vehicle is decreased or output of the tail motor 10 arranged in rear side of the aerial vehicle is increased in the vertical flight mode, the head of the aerial vehicle is lifted downward and thus the aerial vehicle may perform the downward pitch operation.

Figure 9:
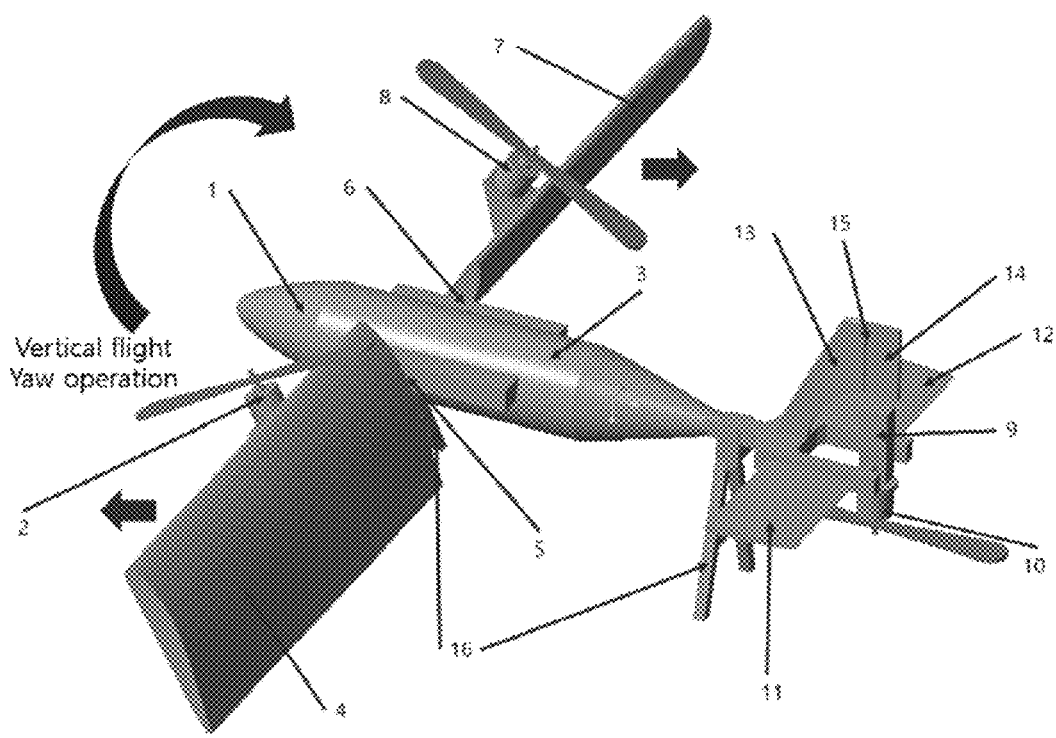
FIG. 9 shows a yaw motion of the aerial vehicle in the vertical flight mode.

FIG. 9 shows a yaw motion of the aerial vehicle in the vertical flight mode.

FIG. 9 shows a yaw operation of the aerial vehicle in the vertical flight mode. In the vertical flight mode, when the main wing actuators 5 and 6 tilts the electric main wing motors 2 and 8 in opposite directions, respectively, the aerial vehicle may rotate in clockwise or counterclockwise direction on the horizontal plane. As illustrated in FIG. 9, when the main wing actuators 5 and 6 independently tilt the main wings 4 and 7 such that a front side of the right main wing 7 faces the rear side of the aerial vehicle and a front side of the left main wing 4 faces the front side of the aerial vehicle, the thrust provided from the right main wing motor 8 may include a horizontal component directing toward the rear side of the aerial vehicle and the thrust provided from the left main wing motor 2 may include a horizontal component directing toward the front side of the aerial vehicle. These opposite horizontal components may rotate the aerial vehicle in clockwise direction on the horizontal plane when we see the aerial vehicle from above thereby providing the yaw motion to the aerial vehicle. On the contrary, when the main wing actuators 5 and 6 independently tilt the main wings 4 and 7 such that the front side of the right main wing 7 faces the front side of the aerial vehicle and the front side of the left main wing 4 faces the rear side of the aerial vehicle, the thrust provided from the right main wing motor 8 may include a horizontal component directing toward the front side of the aerial vehicle and the thrust provided from the left main wing motor 2 may include a horizontal component directing toward the rear side of the aerial vehicle. These opposite horizontal components may rotate the aerial vehicle in counterclockwise direction on the horizontal plane when we see the aerial vehicle from above thereby providing the yaw motion to the aerial vehicle.

Figure 10:
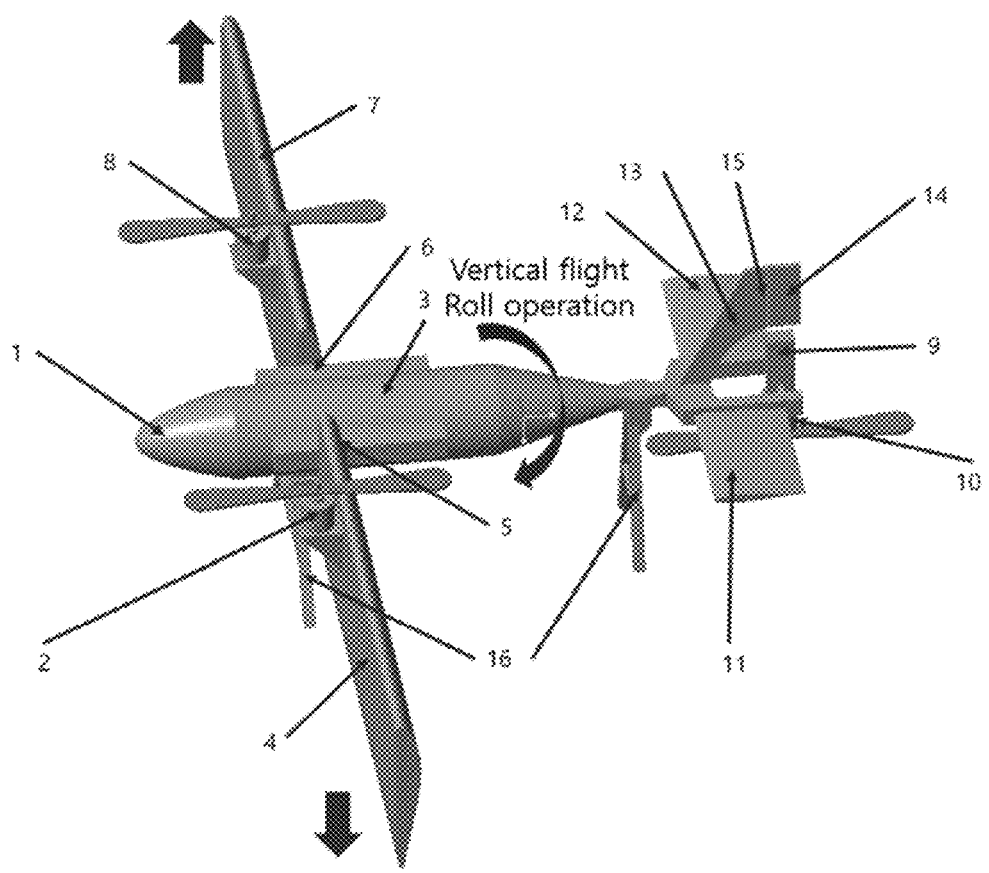
FIG. 10 shows a roll motion of the aerial vehicle in the vertical flight mode.

FIG. 10 shows a roll motion of the aerial vehicle in the vertical flight mode.

FIG. 10 shows a roll operation of the aerial vehicle in the vertical flight mode. In the vertical flight mode, the aerial vehicle may be provided with the roll motion by adjusting outputs of the electric main wing motors 2 and 8 while the thrust provided by the electric main wing motors 2 and 8 and the tail motor 10 are kept in the vertical direction without tilting the main wings 4 and 7 and the tail motor 10. When increasing the output of the right main wing motor 8 and decreasing the output of the left main wing motor 2, the aerial vehicle may roll in clockwise direction when we see the aerial vehicle from the front thereof. On the contrary, when decreasing the output of the right main wing motor 8 and increasing the output of the left main wing motor 2, the aerial vehicle may roll in counterclockwise direction when we see the aerial vehicle from the front thereof.

Figure 11:
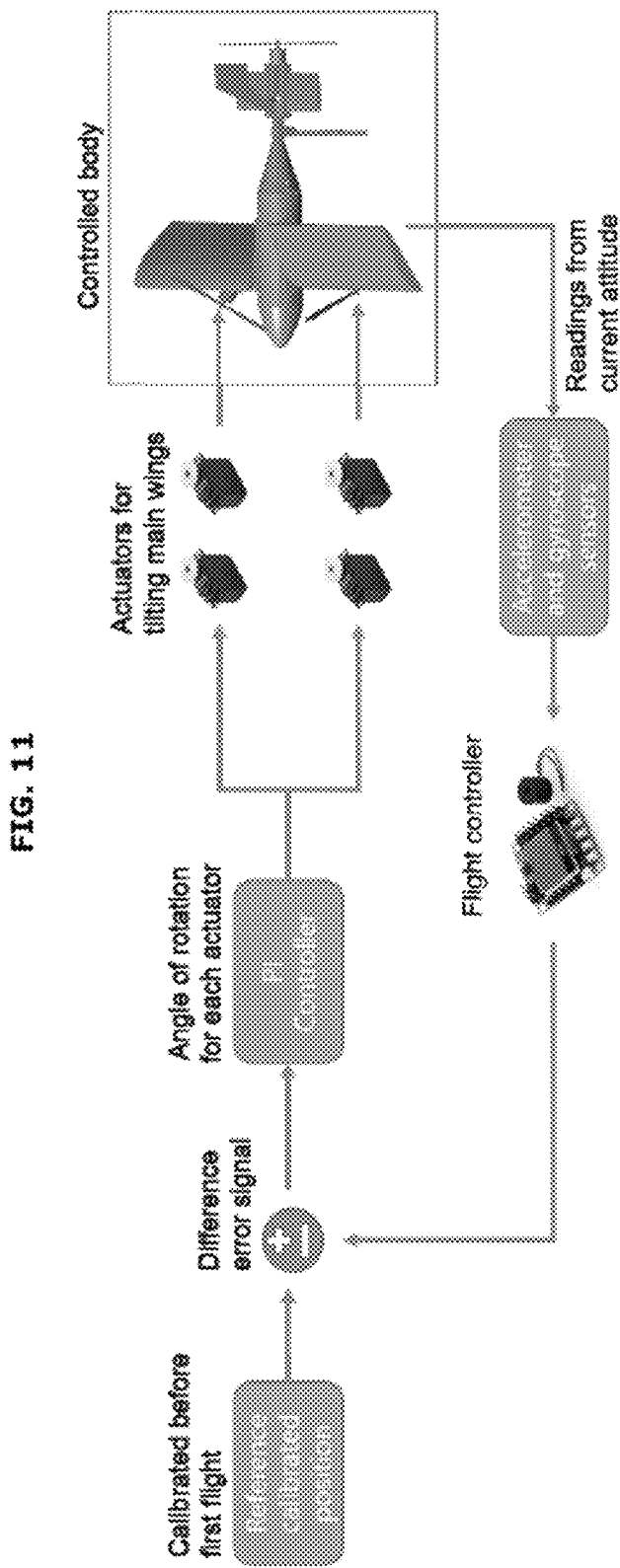
FIG. 11 schematically shows a control system included in the aerial vehicle of FIG. 1.

FIG. 11 schematically shows a control system included in the aerial vehicle of FIG. 1.

The control system of the aerial vehicle may include an internal memory. Reference position values representing reference positions of the aerial vehicle may be stored in advance in the internal memory.

The control system may further include an accelerometer and a gyroscope. The accelerometer and the gyroscope may detect current position of the aerial vehicle airborne. In order to reduce vulnerabilities to noise of the accelerometer and the gyroscope, the control system may further include a noise filter such as the extended Kalman filter.

The control system may further include a position correction unit. For example, the position correction unit may be the proportional-integral (PI) controller. The position correction unit may compare the reference position values stored in the internal memory with the values of the current position of the aerial vehicle airborne detected by the accelerometer and the gyroscope. The position correction unit may calculate an error value based on the comparison. The error value may represent the to-be-corrected position of the aerial vehicle airborne. The position correction unit may provide the error value to the main wing actuators 5 and 6, the tail actuator 9, the vertical tail actuator 15, the electric main wing motors 2 and 8 and the tail motor 10.

The main wing actuators 5 and 6, the tail actuator 9, the vertical tail actuator 15, the electric main wing motors 2 and 8 and the tail motor 10 may control the thrust of the electric main wing motors 2 and 8 and the tail motor 10, the tilting degree of the main wings 4 and 7, the tail motor 10 and the rudder 14 in order to compensate the provided error value. Through the adjustment of the tilting and thrust for the position correction of the aerial vehicle, the aerial vehicle may be stabilized during the flight mode.

FIGS. 12 to 19 show various embodiments of the connection relation between the main wings 4 and 7 and the main wing actuators 5 and 6 in order to provide the independent tilting of the main wings 4 and 7, which will not limit the scope of the embodiments of the present disclosure.

Figure 12:
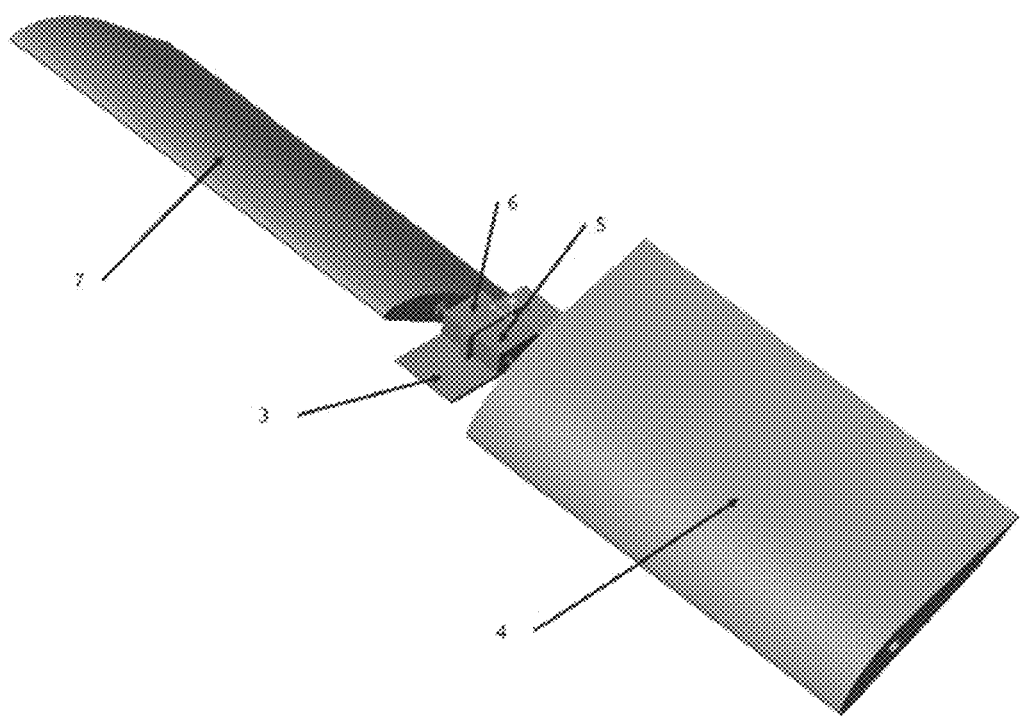
FIGS. 12 to 20 show various embodiments of connection between main wings and actuators of the main wings.

FIG. 12 shows an embodiment of the connection between the main wings 4 and 7 and the main wing actuators 5 and 6.

In accordance with an embodiment of the present disclosure, the main wings 4 and 7 may be provided apart from each other for the independent tilting thereof. The main wing actuators 5 and 6 may be configured to tilt the main wings 4 and 7 and combining the main wings 4 and 7 to the main body 3. The main wing actuators 5 and 6 may be mounted on the main body 3. The main wings 4 and 7 may be directly coupled to rotation axes of the main wing actuators 5 and 6, respectively. The main wing actuators 5 and 6 may be operative independently from each other. Therefore, the main wing actuators 5 and 6 may independently tilt the main wings 4 and 7, respectively.

Figure 13:
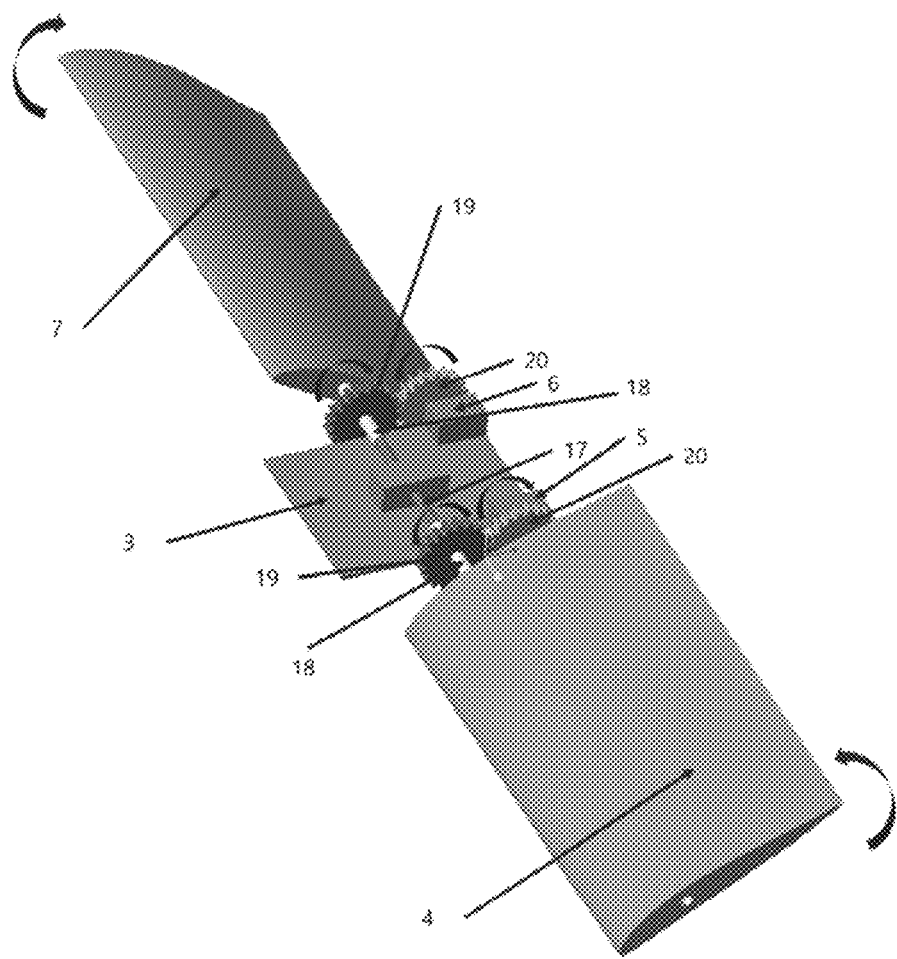

FIG. 13 shows an embodiment of the connection between the main wings 4 and 7 and the main wing actuators 5 and 6.

The direct connection between the main wings 4 and 7 and the rotation axes of the main wing actuators 5 and 6 may require security since the direct connection couples the main wings 4 and 7 to the main body 3 with a small area limitation and sustains the weights of the main wings 4 and 7 and the air resistance experienced by the main wings 4 and 7 while airborne. The security may be implemented by external metal rods 18. The external metal rods 18 may be of a tube. The external metal rods 18 may respectively penetrate the main wings 4 and 7 and a part of the main body 3. The main wings 4 and 7 may be fixed by the external metal rods 18, respectively.

The external metal rods 18 may be supported by inner metal rods 17 each having an outer diameter of the same size as an inner diameter of corresponding one between the external metal rods 18. With the inner metal rods 17 respectively inserted in the external metal rods 18, the external metal rods 18 may be adapted to freely revolve. The inner metal rods 17 having smaller external diameters may be fixed to the main body 3, and the external metal rods 18 may be adapted to independently and freely revolve along with external surfaces of the inner metal rods 17, respectively. Therefore, the inner metal rods 17 in the insides of the external metal rods 18 may guarantee the independent tilt of the main wings 4 and 7 besides supporting the main wings 4 and 7 to keep staying in their locations, respectively.

Gears 19 may be provided to the external metal rods 18 in the inside of the main body 3, respectively. The tilt of the main wings 4 and 7 may be controlled by the main wing actuators 5 and 6 arranged on the main body 3. Gears 20 may also be provided to the main wing actuators 5 and 6, respectively. The gears 19 and 20 may interlock with each other and revolve in opposite directions to each other according to gear ratio. Accordingly, when the main wing actuators 5 and 6 rotate to some degree, the gears 20 of the main wing actuators 5 and 6 may revolve to the same degree. Therefore, the gears 19 of the external metal rods 18 may revolve in the opposite direction to the gears 20 of the main wing actuators 5 and 6 according to the gear ratio, respectively. As the external metal rods 18 revolves along with the gears 19, the main wings 4 and 7 fixed to the external metal rods 18 may rotate in the opposite direction to the gears 20 of the main wing actuators 5 and 6 according to the gear ratio of the gears 19 and 20, respectively, which tilts the main wings 4 and 7.

Figure 14:
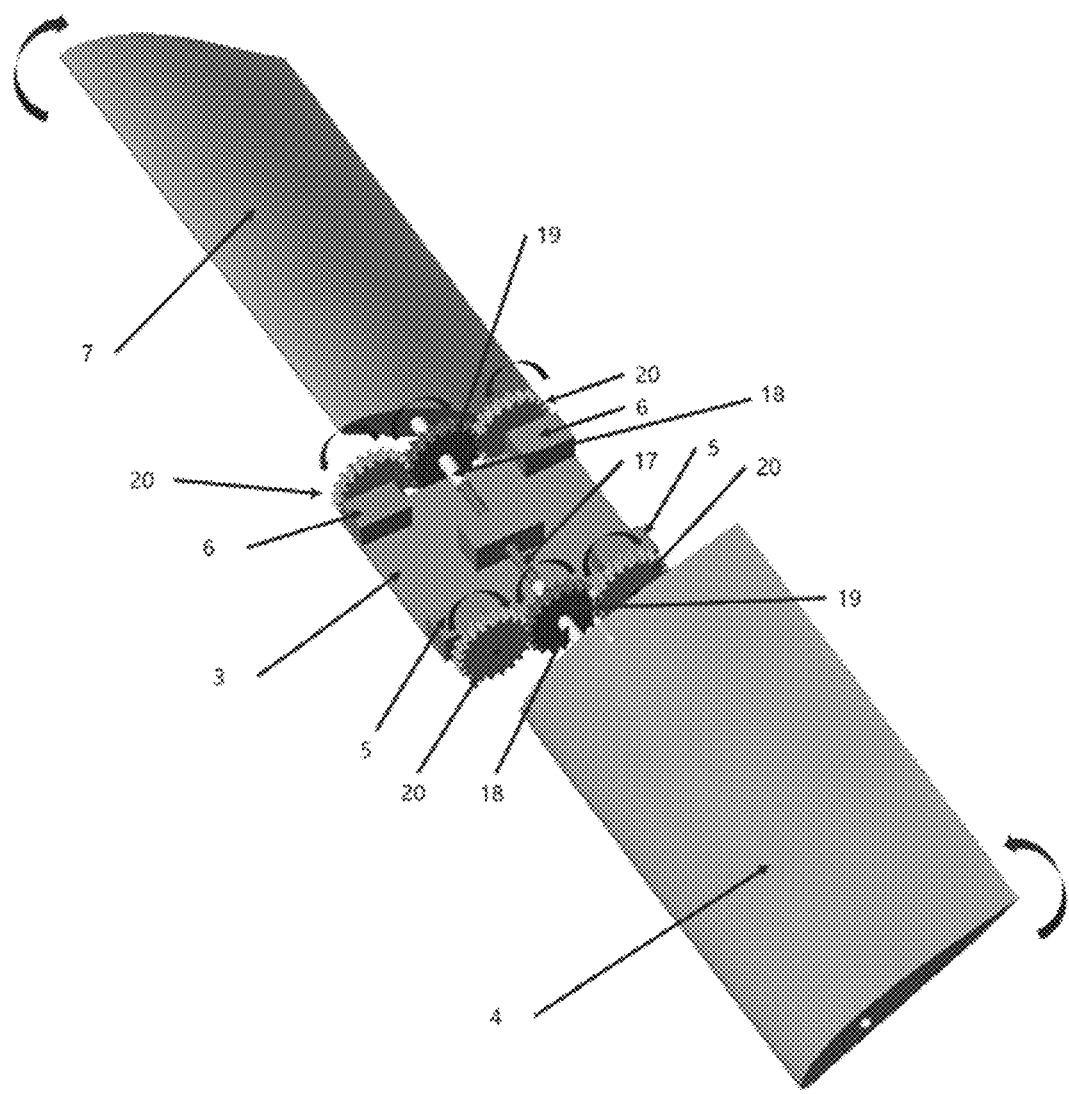

FIG. 14 shows an embodiment of the connection between the main wings 4 and 7 and the main wing actuators 5 and 6.

Figure 15:
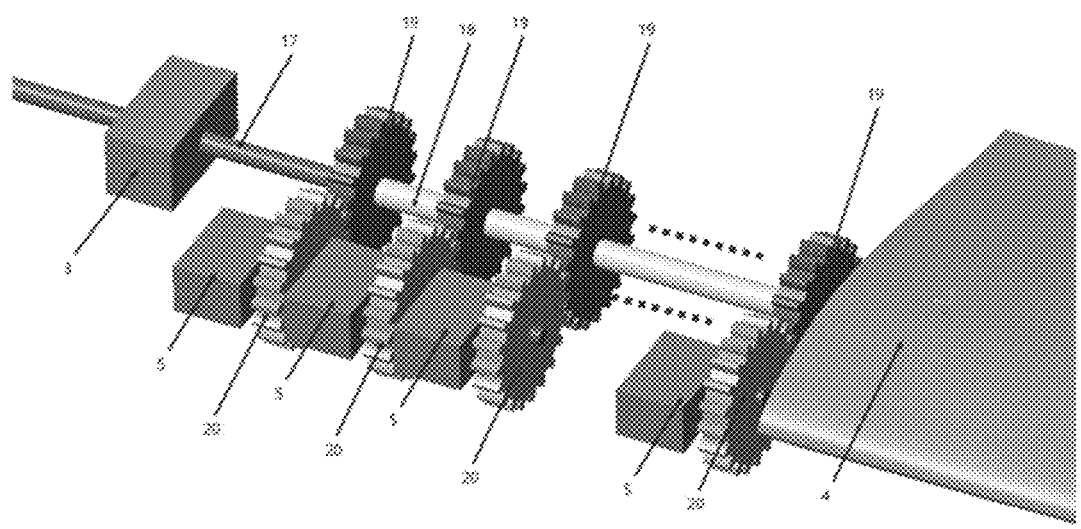

FIG. 15 shows an embodiment of the connection between the main wings 4 and 7 and the main wing actuators 5 and 6.

There may require a great deal of force to tilt the main wings 4 and 7 airborne. This is because the tilting operation should be performed by greater force than sum of the thrust generated by the electric main wing motors 2 and 8 of the main wings 4 and 7 and the air resistance experienced by the main wings 4 and 7. In an embodiment, for the smooth tilting operation, the main wing actuators 5 and 6 may be provided in plural to provide force sufficient to perform the tilting operation. As illustrated in FIG. 14, a plurality of main wing actuators 5 and 6 may be serially coupled to the gears 20. As illustrated in FIG. 15, the plurality of main wing actuators 5 and 6 may be coupled in parallel to the gears 20. The gear ratio of the gears 19 and 20 may vary in order to adjust the tilting degree of the main wings 4 and 7.

Although the present disclosure shows embodiments of the electric main wing motors 2 and 8 and the gears 19 and 20 coupled to the main wing actuators 5 and 6 for the description of the aerial vehicle having the main wings 4 and 7 capable of independent tilt, the scope of the embodiment of the present disclosure will not be limited thereto. For example, various actuators such as hydraulic and pneumatic cylinders 21, links 24 and 25, epicyclic gear devices 26 to 29, racks and pinions 30, linear motor and so forth may be applied to the aerial vehicle.

Figure 16:
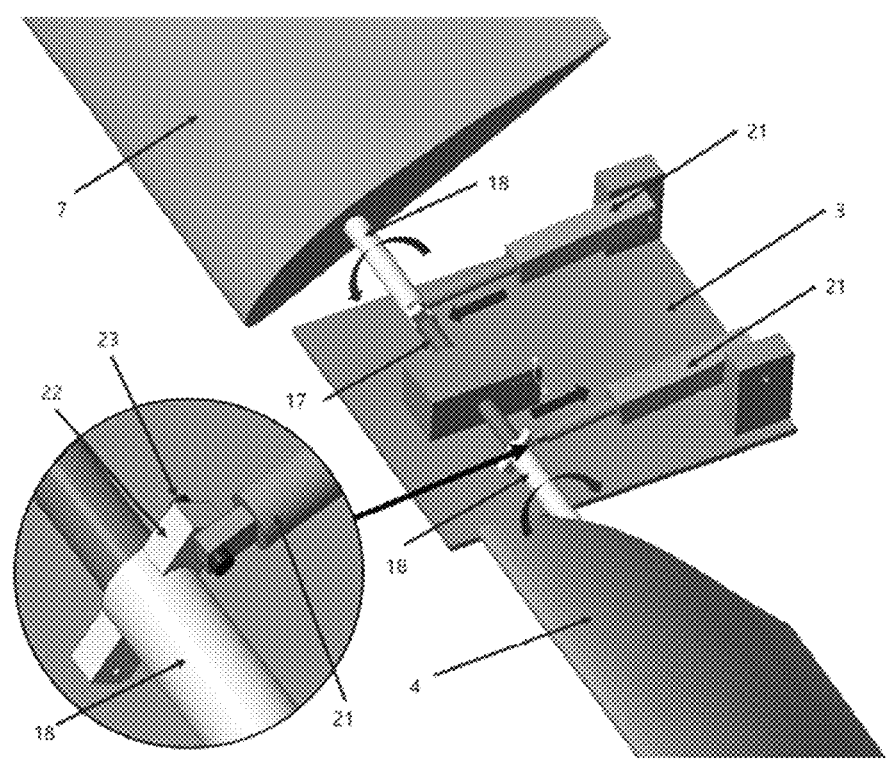

FIG. 16 shows an embodiment of the connection between the main wings 4 and 7 and the hydraulic and pneumatic cylinders 21.

The external metal rods 18 in the main body 3 may be coupled to pistons of the hydraulic and pneumatic cylinders 21 through structures 22 thereof and pins 23, respectively. The external metal rods 18 and the pistons of the hydraulic and pneumatic cylinders 21 may be coupled to each other through the pins 23, and thus the external metal rods 18 and the pistons of the hydraulic and pneumatic cylinders 21 may be fixed to each other while rotating. The tilting of the main wings 4 and 7 may be controlled by the hydraulic and pneumatic cylinders 21 arranged in the main body 3. The external metal rods 18 may rotate as the hydraulic and pneumatic cylinders 21 push and pull the pistons thereof. When the hydraulic and pneumatic cylinders 21 pull the pistons thereof, the external metal rods 18 coupled to the pistons through the pins 23 may also be pulled and thus the external metal rods 18 may rotate in clockwise direction. When the hydraulic and pneumatic cylinders 21 push the pistons thereof, the external metal rods 18 coupled to the pistons through the pins 23 may also be pushed and thus the external metal rods 18 may rotate in counterclockwise direction. Therefore, the main wings 4 and 7 coupled to the external metal rods 18 may be tilted. The tilting degrees of the main wings 4 and 7 may depend on how much the hydraulic and pneumatic cylinders 21 push and pull the pistons thereof, respectively. In an embodiment, the hydraulic and pneumatic cylinders 21 may be provided in plural in order to provide greater power. The plurality of the hydraulic and pneumatic cylinders 21 may be coupled to each other in serial or parallel way.

Figure 17:
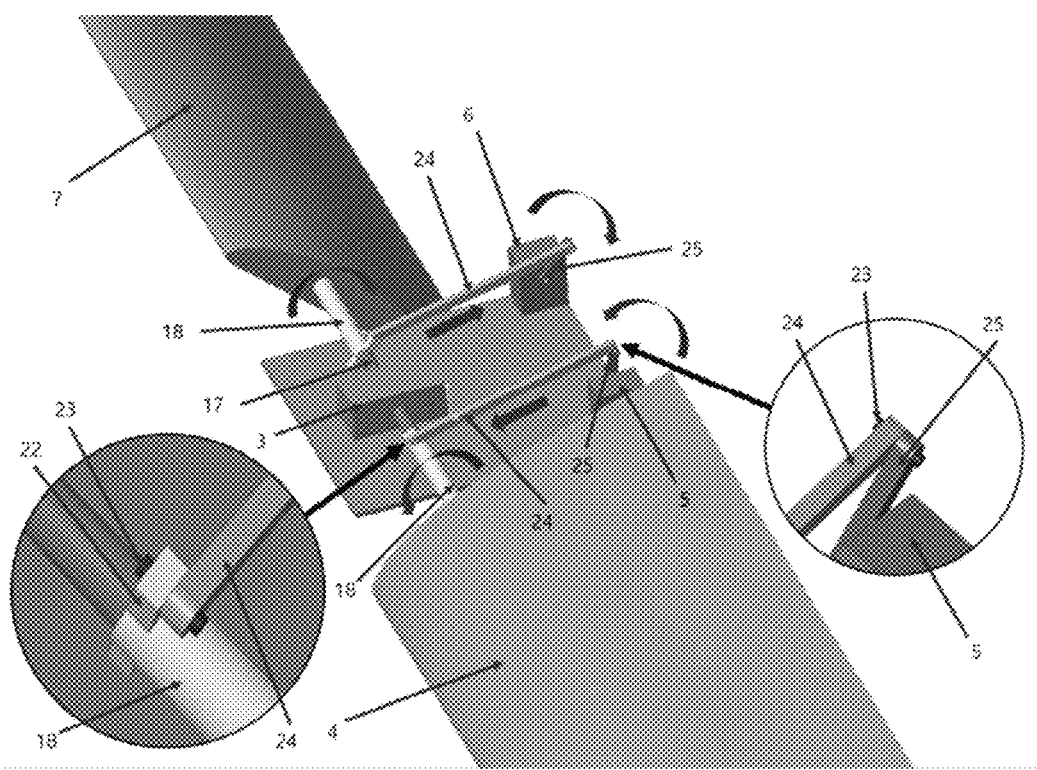

FIG. 17 shows an embodiment of the connection of structure including the main wings 4 and 7, a long link 24, a short link 25 and main wing actuators 5 and 6.

The external metal rods 18 in the main body 3 may be coupled to the long links 24 through structures 22 thereof and pins 23, respectively. The long links 24 may be coupled to the short links 25 through other pins 23, respectively. The short links 25 may be coupled to the main wing actuators 5 and 6. The external metal rods 18, the long links 24, the short links 25 and the main wing actuators 5 and 6 may be coupled to each other through the pins 23, and thus the external metal rods 18, the long links 24 and the short links 25 may be fixed to each other while rotating. The tilting of the main wings 4 and 7 may be controlled by the ling links 24, the short links 25 and the main wing actuators 5 and 6 arranged in the main body 3. The external metal rods 18 coupled to the long links 24 may rotate as the main wing actuators 5 and 6 push and pull the long links 24 by rotating the short links 25. When the main wing actuators 5 and 6 rotate the short links 25 in clockwise direction, the long links 24 may be pulled and thus the external metal rods 18 coupled to the long links 24 may rotate in clockwise direction. When the main wing actuators 5 and 6 rotate the short links 25 in counterclockwise direction, the long links 24 may be pushed and thus the external metal rods 18 coupled to the long links 24 may rotate in counterclockwise direction. Therefore, the main wings 4 and 7 coupled to the external metal rods 18 may be tilted. The tilting degrees of the main wings 4 and 7 may depend on how much the main wing actuators 5 and 6 push and pull the long links 24 by rotating the short links 25, respectively. In an embodiment, the main wing actuators 5 and 6 and the long and short links 24 and 25 may be provided in plural in order to provide greater power. The plurality of the main wing actuators 5 and 6 and the long and short links 24 may be coupled to each other in serial or parallel way.

Figure 18:
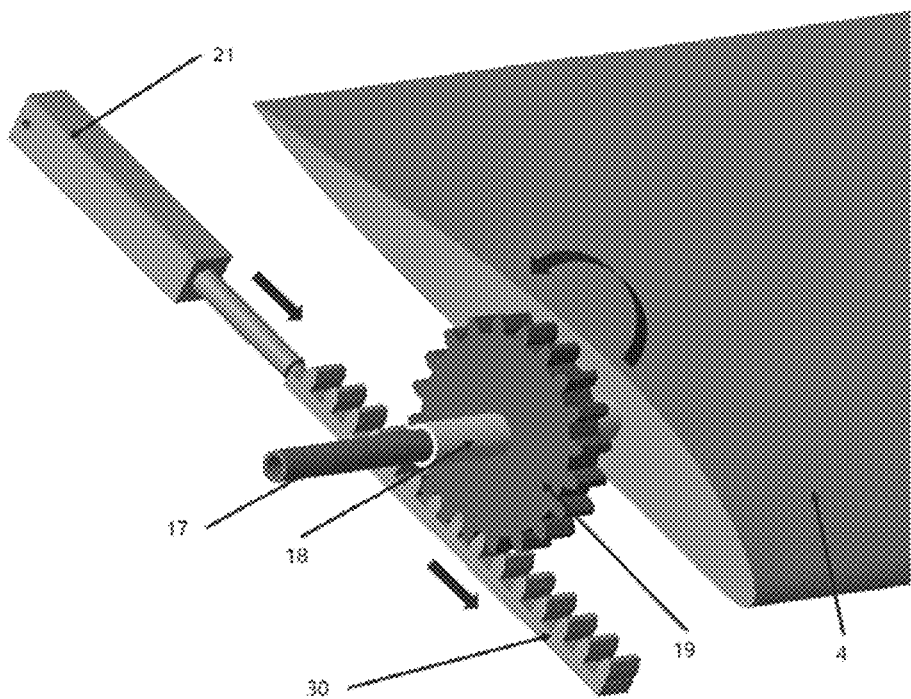

FIG. 18 shows an embodiment of the connection of structure including the main wings 4 and 7, the racks and pinions 30 and the hydraulic and pneumatic cylinders 21.

The pinions of the racks and pinions 30 adapted to rotate according to translation motion of the racks of the racks and pinions 30 may be implemented as the gears 19 provided to the external metal rods 18 in the inside of the main body 3, respectively. The racks of the racks and pinions 30 may be coupled to the hydraulic and pneumatic cylinders 21. As the hydraulic and pneumatic cylinders 21 push and pull pistons, the racks of the racks and pinions 30 may make translation motions. The translation motions of the racks of the racks and pinions 30 may rotate the gears 19 of the racks and pinions 30 interlocked to the racks of the racks and pinions 30. The rotation of the gears 19 of the racks and pinions 30 may rotate the external metal rods 18 coupled to the gears 19 of the racks and pinions 30, which tilts the main wings 4 and 7. The tilting degrees of the main wings 4 and 7 may depend on how much the hydraulic and pneumatic cylinders 21 push and pull the pistons. The hydraulic and pneumatic cylinders 21 adapted to move the racks of the racks and pinions 30 may be replaced with the linear motors.

Figure 19:
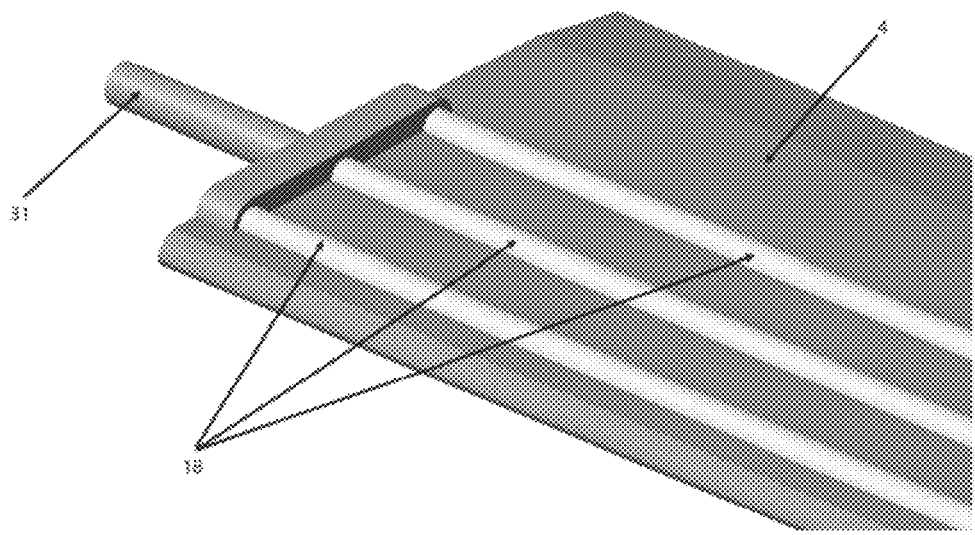

FIG. 19 shows an embodiment of the connection between the main wings 4 and 7 and the main wing actuators 5 and 6.

The direct connection between the main wings 4 and 7 and the single external metal rod 18 is not enough to support and tilt the main wings 4 and 7. The security may be implemented by a plurality of the external metal rods 18. The plurality of the external metal rods 18 may disperse a great deal of loads from the main wings 4 and 7 when the main wings 4 and 7 tilt. The plurality of the external metal rods 18 may prevent bent thereof and slip between the external metal rods 18 and the main wings 4 and 7 when the main wings 4 and 7 tilt. In accordance with an embodiment of the present invention, the plurality of the external metal rods 18 may penetrate the main wings 4 and 7 and may support the main wings 4 and 7 in the inside of the main wings 4 and 7. At ends of the main wings 4 and 7, connectors 31 may combine the plurality of the external metal rods 18. The connectors 31 may be tube-typed rods toward the main body 3. The connectors 31 in combination with the embodiments described with reference to FIGS. 12 to 18 may be tilt the main wings 4 and 7.

Figure 20:
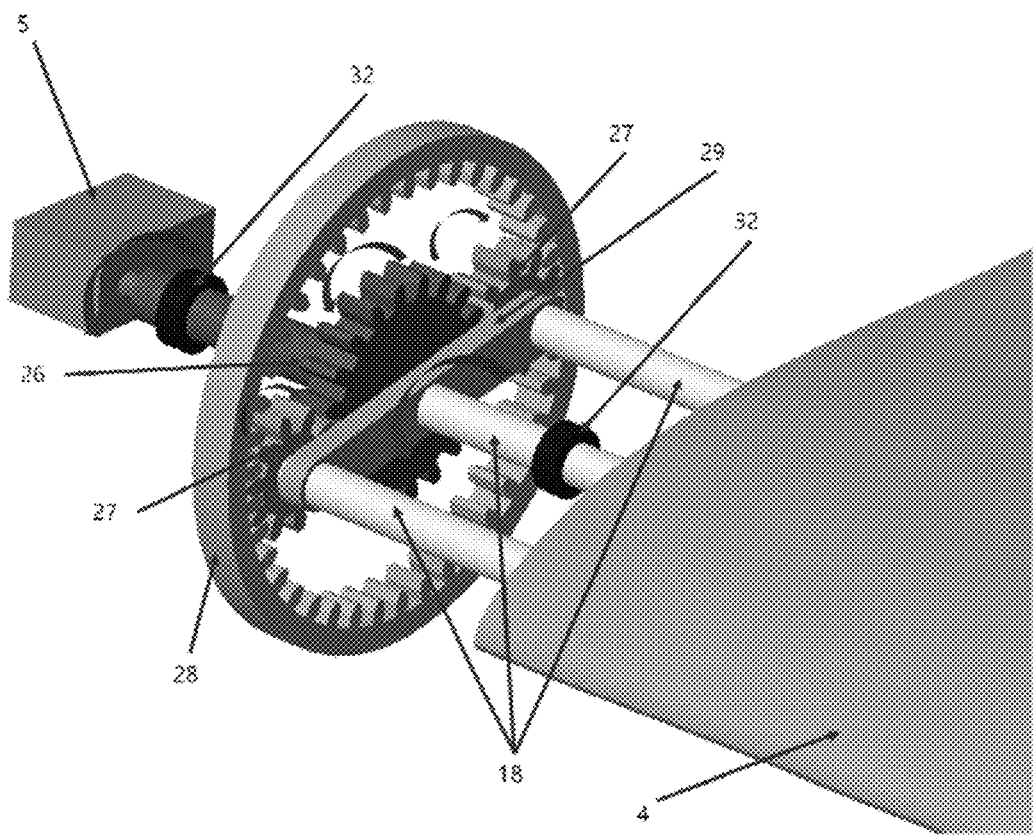

FIG. 20 shows an embodiment of the connection of structure including the main wings 4 and 7, the epicyclic gear devices 26 to 29 and the main wing actuators 5 and 6.

The epicyclic gear devices 26 to 29 may comprise sun gears 26, planetary gears 27, ring gears 28 and carriers 29, respectively. The ring gears 28 may be fixed and the main wing actuators 5 and 6 may rotate the sun gears 26. Then, the planetary gears 27 may rotate in opposite direction to the rotation direction of the sun gears 26 while revolving along the surfaces of the sun gears 26 and the ring gears 28 in the same direction as the rotation direction of the sun gears 26. Therefore, the planetary gears 27 may provide through the carriers 29 rotational output of the same direction as the rotation direction of the sun gears 26. A number of planetary gears 27 may vary. The carriers 29 may keep the planetary gears 27 in a predetermined distance and keep them revolving together by supporting the rotating axes of the planetary gears 27. The sun gears 26 and the plurality of planetary gears 27 may have rotating axes thereof, respectively, and thus the sun gears 26 and the plurality of planetary gears 27 may be coupled to the external metal rods 18 through bearings, which increase structural stability of the main wings 4 and 7 adapted to tilt. As shown in FIG. 20, other external metal rods 18 may be coupled to the same axes to the planetary gears 27 besides the external metal rods 18 coupled to the same axes to the sun gears 26. The added external metal rods 18 may also be coupled to the carriers 29 and may revolve together with the planetary gears 27 through the carriers 29 as the planetary gears 27 revolve. The plurality of external metal rods 18 may strongly support the main wings 4 and 7 to tilt. A number of external metal rods 18 may depend on the number of planetary gears 27. A rotation speed of the carriers 29 may depend on the rotation speed of the sun gears 26 and teeth numbers of the sun gears 26 and the ring gears 28.

The sun gears 26 of the epicyclic gear devices 26 to 29 may be directly coupled to the main wing actuators 5 and 6, which is similar to the embodiment described with reference to FIG. 12. Referring to FIG. 20, bearings 32 may support the external metal rods 18 and may prevent bent of the external metal rods 18. The bearings 32 may be coupled to the main body 3. The bearing 32 may be provided as many as required at various rotation axes to prevent vibration of the rotation axes and to enhance smooth rotation of the rotation axes such that the rotation axes are supported not from internal but from external thereof. The bearings 32 may be applied to all the disclosed embodiments.

Figure 21:
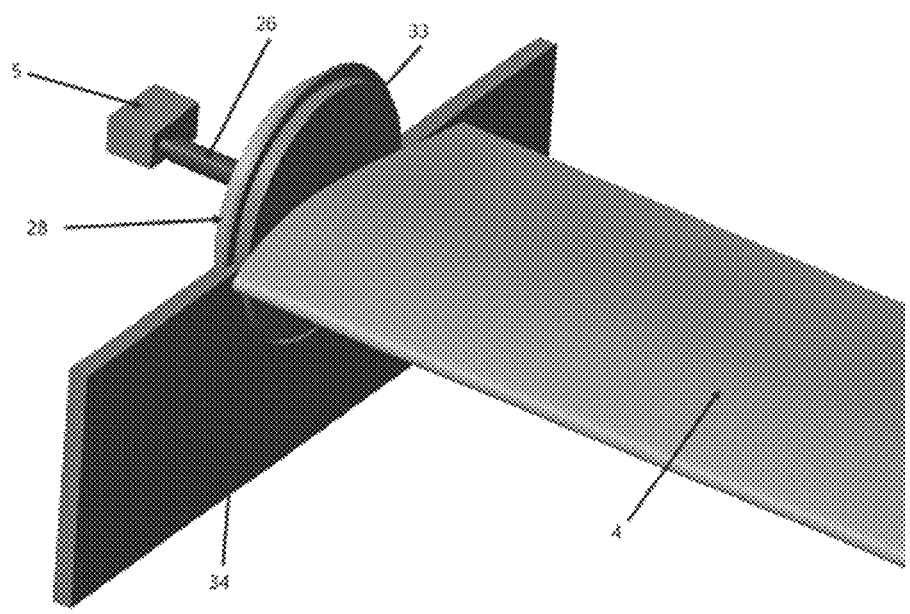
FIG. 21 shows an embodiment of a housing of the epicyclic gear devices.

FIG. 21 shows an embodiment of a housing of the epicyclic gear devices 26 to 29.

One of considerations for the aerial vehicle having main wings 4 and 7 capable of tilting is the airflow between the main wings 4 and 7 and the main body 3. In a general aerial vehicle, when main wings are fixed to a main body in an integrated form, air flows naturally along with the surfaces of the main body and main wings. However, main wings should be physically separated from a main body to implement the tilt of the main wings. Airflow in gaps between the main body and the main wings may exercise an adverse effect on an aerial vehicle airborne with a great speed. FIG. 21 shows an embodiment of a housing adapted to reduce the gaps between the main body 3 and the main wings 4 and 7 when the epicyclic gear devices 26 to 29 are implemented to the aerial vehicle in accordance with an embodiment of the present invention. The carriers 29 may be the axes of outputs of the epicyclic gear devices 26 to 29. Therefore, the main wings 4 and 7 may tilt as the carriers 29 rotate. As illustrated in FIG. 21, disk-typed carriers 33 may be provided to surround the ring gears 28. The disk-typed carriers 33 may have male-typed flanges on sides thereof, which is similar to a train wheel. The main wings 4 and 7 may be fixed to the disk-typed carriers 33. Through the external metal rods 18, the main wings 4 and 7, the disk-typed carriers 33, the sun gears 26 and the planetary gears 27 may be coupled to each other. Surface 34 of the main body 3 may have holes. The holes may have female-typed flanges to allow the flanges of the disk-typed carriers 33 to fit thereto and surround the disk-typed carriers 33 on the side of the disk-typed carriers 33. The holes may have appropriate size such that the disk-typed carriers 33 smoothly rotate. In accordance with an embodiment of the present invention, the contact surface between the disk-typed carriers 33 and the main wings 4 and 7 may be aligned to the surface 34 of the main body 3, and thus the main wings 4 and 7 may tilt without gaps between the surface 34 of the main body 3 and the main wings 4 and 7. Although the male-typed and female-typed flanges fitting into each other may have a little gap, whose direction is perpendicular and opposite to the airflow on the surface 34 of the main body 3, influx of the airflow into the main body 3 may be reduced.

Figure 22:
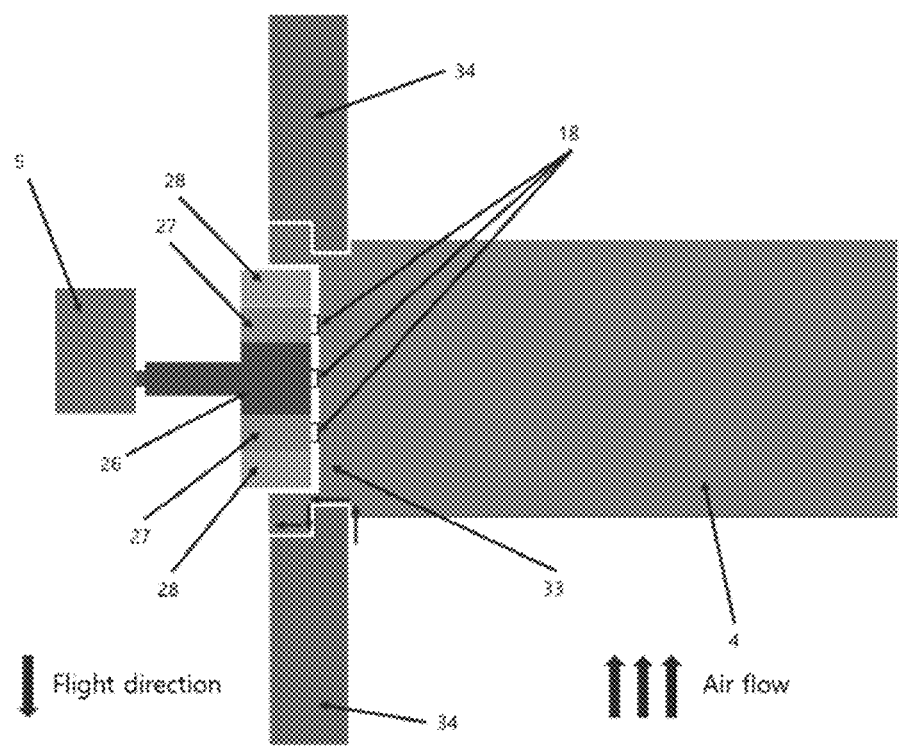
FIG. 22 shows a cross section of FIG. 21.

FIG. 22 shows a cross section of FIG. 21.

Referring to FIG. 22, the disk-typed carriers 33 may couple the planetary gears 27 to the main wings 4 and 7 without touch of the ring gears 28 to the surface 34 of the main body 3, thereby smoothly rotating. As illustrated in FIG. 22, the male-typed flanges of the disk-typed carriers 33 and the female-typed flanges of the holes of the main body 3, which fit into each other, make the little gap, whose direction is perpendicular and opposite to the airflow on the surface 34 of the main body 3.

Figure 23:
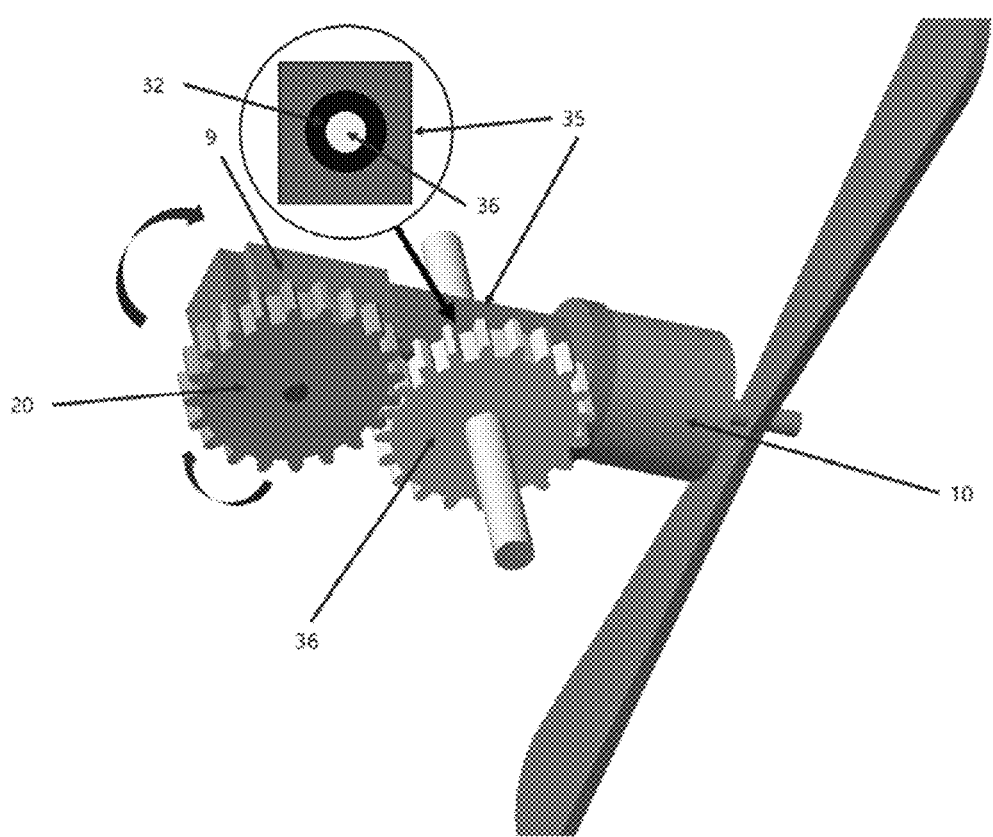
FIG. 23 shows an embodiment of a structure adapted to tilt the tail motor.

FIG. 23 shows an embodiment of a structure 35 adapted to tilt the tail motor 10.

Referring to FIG. 23, the tail motor 10 and the tail actuator 9 may be arranged to the structure 35. The tail actuator 9 may have a gear 20. The structure 35 may be coupled to the main body 3 through a bearing 32 and a cylinder-typed rod having a gear 36. The cylinder-typed rod having a gear 36 may be fixed to the main body 3. The gear 36 of the cylinder-typed rod may be interlocked with the gear 20 of the tail actuator 9. Since the gear 36 of the cylinder-typed rod is fixed to the main body 3, the gear 36 of the cylinder-typed rod may not rotate. Therefore, when the tail actuator 9 rotates the gear 20, the gear 20 may revolve around the gear 36 of the cylinder-typed rod. As the gear 20 revolves around the gear 36 of the cylinder-typed rod, the structure may rotate with reference to the cylinder-typed rod, which tilts the tail motor 10. The tilting degrees of the tail motor 10 may depend on the gear ratio of the gear 20 of the tail actuator 9 and the gear 36 of the cylinder-typed rod and on how much the gear 20 of the tail actuator 9 rotates.

When the aerial vehicle is manned one that a man can board, the electric main wing motors 2 and 8 and the tail motor 10, which are adapted to provide thrust by propellers, may be replaced with various propulsion engines such as a turbo propeller engine 37, a turbofan engine 38, a jet engine 39 and a duct-fan engine 40.

Figure 24:
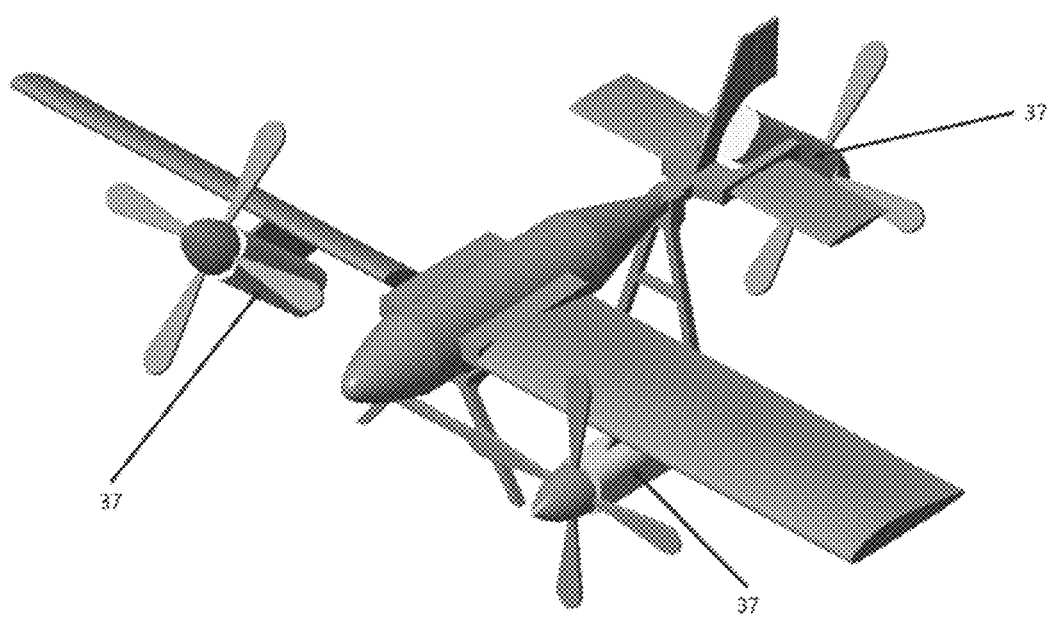
FIG. 24 shows the aerial vehicle having a turbo propeller engine applied as a propulsion engine of the aerial vehicle.

FIG. 24 shows the aerial vehicle having the turbo propeller engine 37 applied as a propulsion engine of the aerial vehicle.

Figure 25:
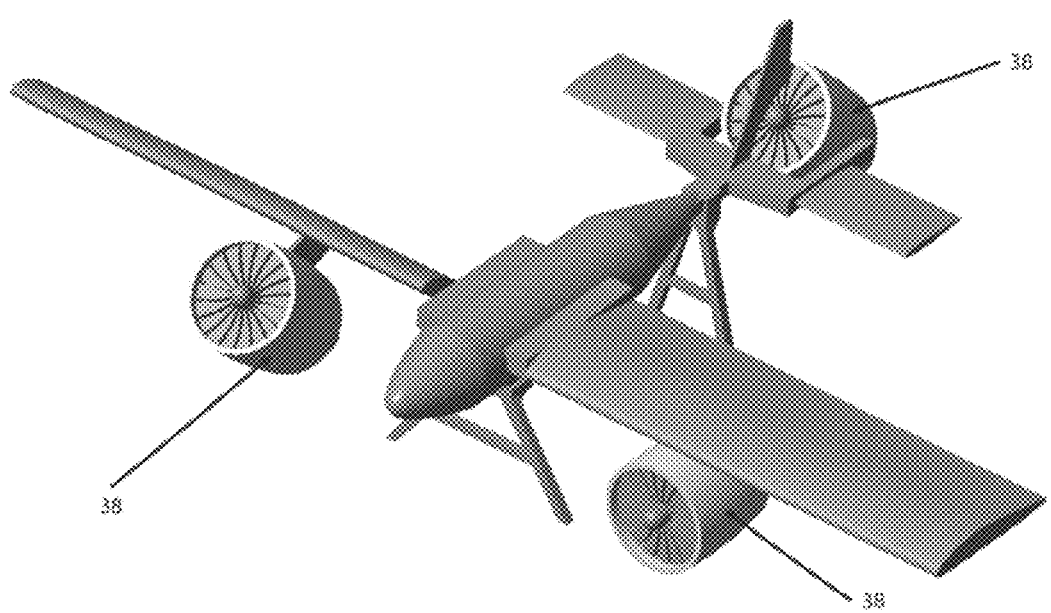
FIG. 25 shows the aerial vehicle having a turbofan engine applied as a propulsion engine of the aerial vehicle.

FIG. 25 shows the aerial vehicle having the turbofan engine 38 applied as a propulsion engine of the aerial vehicle.

Figure 26:
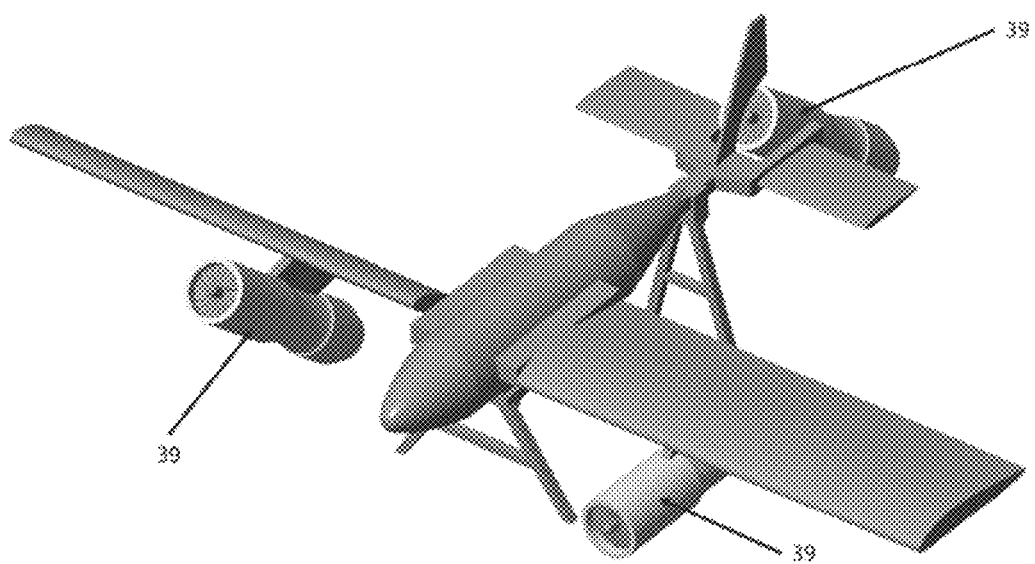
FIG. 26 shows the aerial vehicle having a jet engine applied as a propulsion engine of the aerial vehicle.

FIG. 26 shows the aerial vehicle having the jet engine 39 applied as a propulsion engine of the aerial vehicle.

Figure 27:
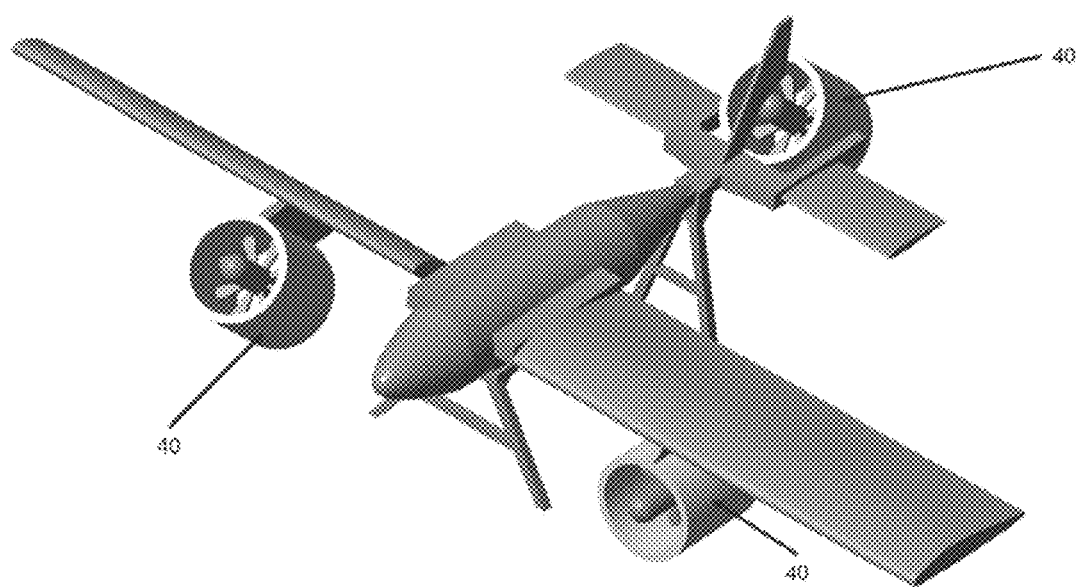
FIG. 27 shows the aerial vehicle having a duct-fan engine applied as a propulsion engine of the aerial vehicle.

FIG. 27 shows the aerial vehicle having the duct-fan engine 40 applied as a propulsion engine of the aerial vehicle.

As described above, in accordance with an embodiment of the present disclosure, the aerial vehicle may obtain a great deal of lift from the main wings 4 and 7 tilted in a direction parallel to the main body 3 thereof in the horizontal flight mode.

In accordance with an embodiment of the present disclosure, the aerial vehicle may center the thrust of motors more upon the propulsion than the lift, which is different from existing copter schemed or tilt-rotor schemed aerial vehicles supposed to center the thrust of motors much more upon the lift than the propulsion. Therefore, in the horizontal flight mode, the aerial vehicle in accordance with an embodiment of the present disclosure may have greater speed and energy efficiency than the existing copter schemed or tilt-rotor schemed aerial vehicles.

In accordance with an embodiment of the present disclosure, in the horizontal flight mode, the aerial vehicle may only use the electric main wing motors 2 and 8 for the thrust while using the tail motor 10 as a generator to charge the battery.

In accordance with an embodiment of the present disclosure, the aerial vehicle may take off and land vertically without runway in the vertical flight mode.

In accordance with an embodiment of the present disclosure, the aerial vehicle may have greater energy efficiency and longer flight time.

In accordance with an embodiment of the present disclosure, the aerial vehicle may stabilize itself without external control.

In accordance with an embodiment of the present disclosure, the aerial vehicle may obtain additional lift from the main wings 4 and 7 capable of tilting.

Although various embodiments have been described for illustrative purposes, it will be apparent to those skilled in the art that various changes and modifications may be made without departing from the spirit and scope of the invention as defined in the following claims.

What is claimed is:

1. An aerial vehicle comprising: a main body arranged in a first direction; two main wings arranged to the main body in a second direction substantially perpendicular to the first direction, the two main wings oppositely arranged to each other;
   two main wing tilting control units respectively coupled to the main wings and adapted to control the main wings to tilt independently of each other;
   two main propulsion units respectively arranged on the main wings;
   tail wings arranged on a rear side of the main body in a second and third direction substantially perpendicular to the first direction;
   a rudder arranged on the tail wing of the third direction; a rudder tilting control unit adapted to control the rudder to tilt; a tail propulsion unit arranged to the rear of the main body;
   a tail tilting control unit adapted to control the tail propulsion unit to tilt;
   a power unit adapted to provide power to the main and tail propulsion units; and
   a position control unit adapted to control the main wing tilting control units, the main propulsion units, the rudder tilting control unit, the tail propulsion unit, and the tail tilting control unit to adjust a position of the aerial vehicle while airborne.

2. The aerial vehicle of claim 1,
   wherein the main wings are of symmetrical configuration, and wherein the tail wings of the second direction are oppositely arranged to each other and of symmetrical configuration.

3. The aerial vehicle of claim 1, wherein the main wing tilting control units and the tail tilting control unit tilt the main wings and the tail wings such that the main and tail propulsion units provide thrust and lift during a flight of the aerial vehicle in the third direction.

4. The aerial vehicle of claim 1, wherein the main wing tilting control units and the tail tilting control unit tilt the main wings and the tail wings such that the main and tail propulsion units provide thrust and lift during a flight of the aerial vehicle in a space formed by the first and second directions.

5. The aerial vehicle of claim 1, wherein the tail propulsion unit is turned off and generates power from an air stream during a flight of the aerial vehicle in a space formed by the first and second directions, and
   wherein the power unit is charged by the tail propulsion unit during the flight of the aerial vehicle in the space formed by the first and second directions.

6. The aerial vehicle of claim 1, wherein the main wing tilting control units tilt the main wings in the same direction so that the aerial vehicle makes a pitch motion during a flight of the aerial vehicle in a space formed by the first and second directions or in the third direction.

7. The aerial vehicle of claim 1, wherein the rudder tilting control unit tilts the rudder so that the aerial vehicle makes a yaw motion during a flight of the aerial vehicle in a space formed by the first and second directions.

8. The aerial vehicle of claim 1, wherein the main wing tilting control units tilt the main wings in opposite directions so that the aerial vehicle makes a roll motion during a flight of the aerial vehicle in a space formed by the first and second directions.

9. The aerial vehicle of claim 1, wherein the main wing tilting control units tilt the main wings in opposite directions so that the aerial vehicle makes a yaw motion during a flight of the aerial vehicle in the third direction.

10. The aerial vehicle of claim 1, wherein the main propulsion units provide different propulsion from each other so that the aerial vehicle makes a roll motion during a flight of the aerial vehicle in the third direction.

11. The aerial vehicle of claim 1, wherein the position control unit includes:
    a memory adapted to store reference position values;
    a sensing unit adapted to generate current position values by sensing current position of the aerial vehicle; and
    a position correction unit adapted to generate correction values by comparing the reference position values and the current position values, and provide the correction values to the main wing tilting 15 control units, the main propulsion units, the rudder tilting control unit, the tail propulsion unit and the tail tilting control unit.

* * * * *